Jan. 8, 1935.  I. F. MANDELL  1,987,482
WRAPPING MACHINE
Original Filed Jan. 29, 1931  15 Sheets-Sheet 1

Jan. 8, 1935. I. F. MANDELL 1,987,482
WRAPPING MACHINE
Original Filed Jan. 29, 1931 15 Sheets-Sheet 3

Jan. 8, 1935.  I. F. MANDELL  1,987,482
WRAPPING MACHINE
Original Filed Jan. 29, 1931    15 Sheets-Sheet 5

Jan. 8, 1935. I. F. MANDELL 1,987,482
WRAPPING MACHINE
Original Filed Jan. 29, 1931 15 Sheets-Sheet 6

Inventor
Irving F. Mandell
Charles W. McDermott
by his Attorney

Jan. 8, 1935.     I. F. MANDELL     1,987,482
WRAPPING MACHINE
Original Filed Jan. 29, 1931    15 Sheets-Sheet 7
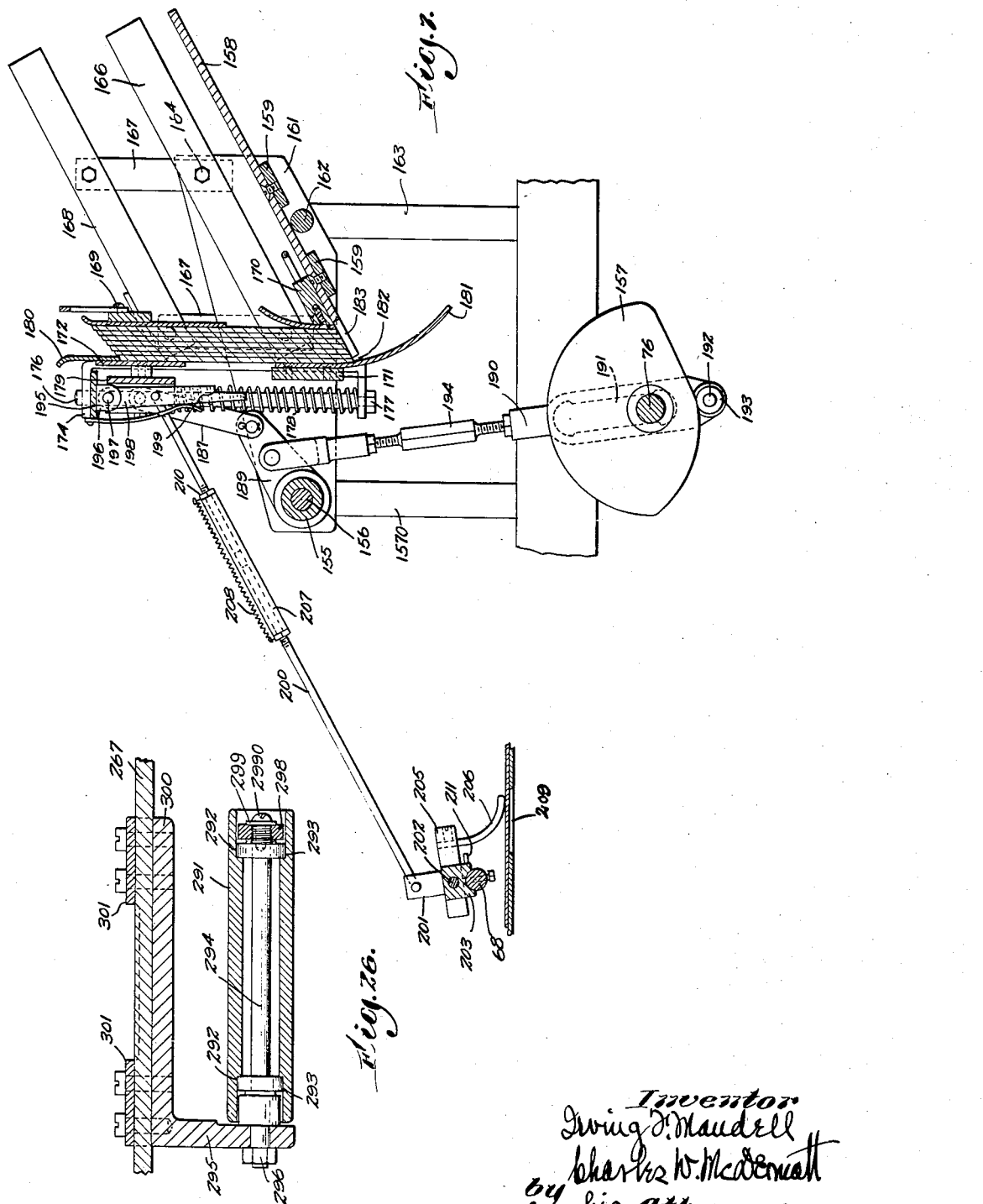

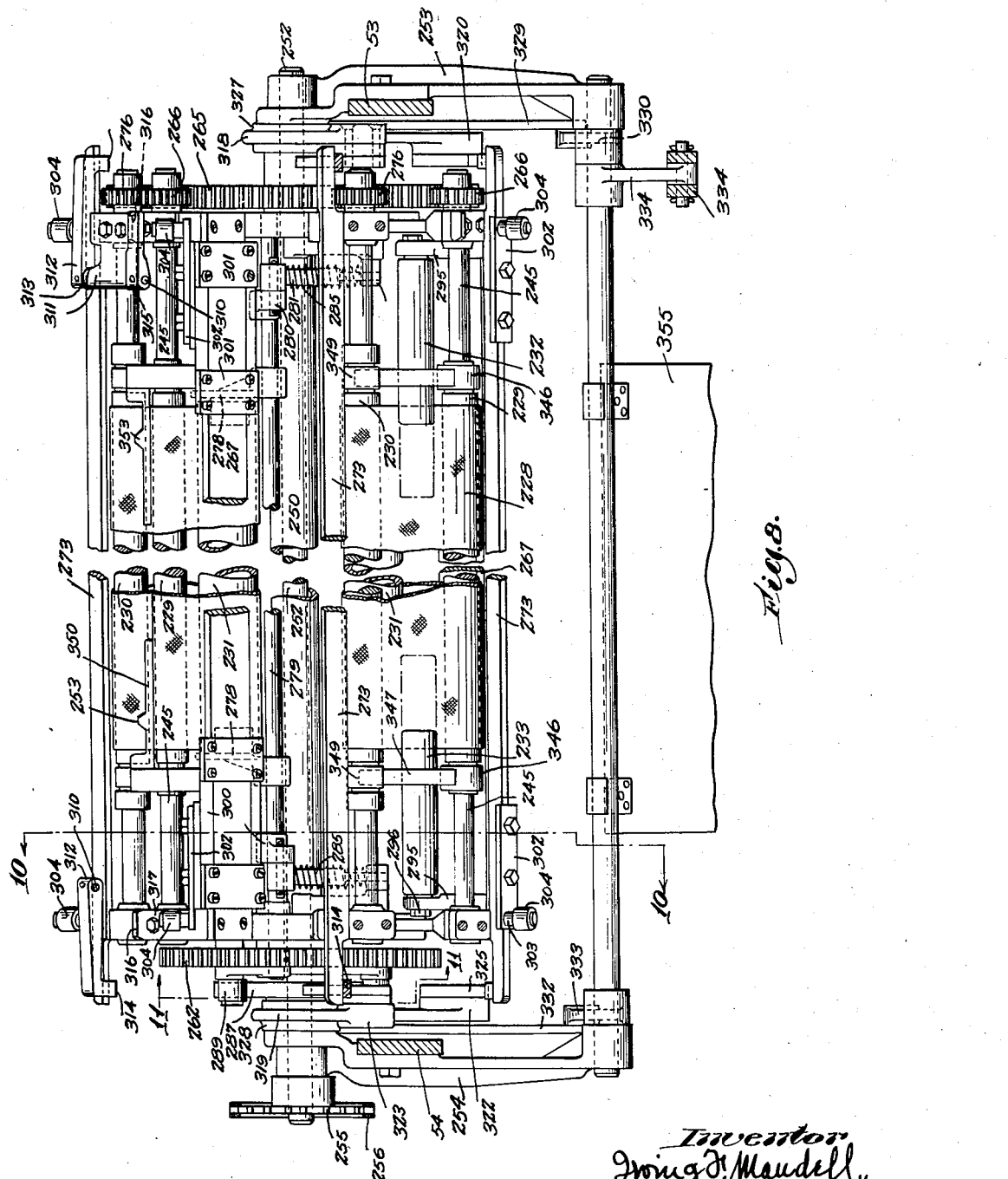

Jan. 8, 1935.	I. F. MANDELL	1,987,482
WRAPPING MACHINE
Original Filed Jan. 29, 1931	15 Sheets-Sheet 9

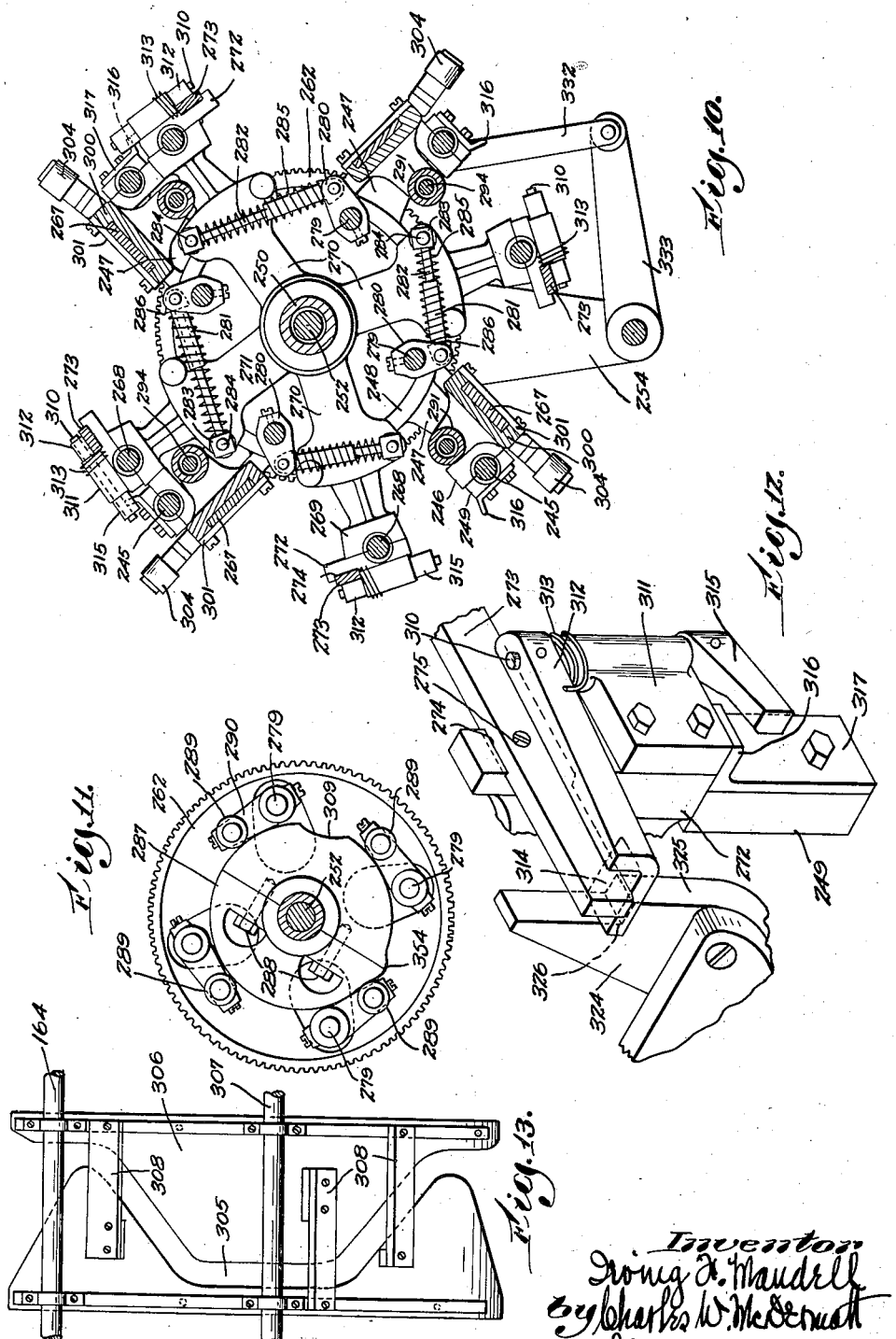

Jan. 8, 1935.  I. F. MANDELL  1,987,482
WRAPPING MACHINE
Original Filed Jan. 29, 1931   15 Sheets-Sheet 11
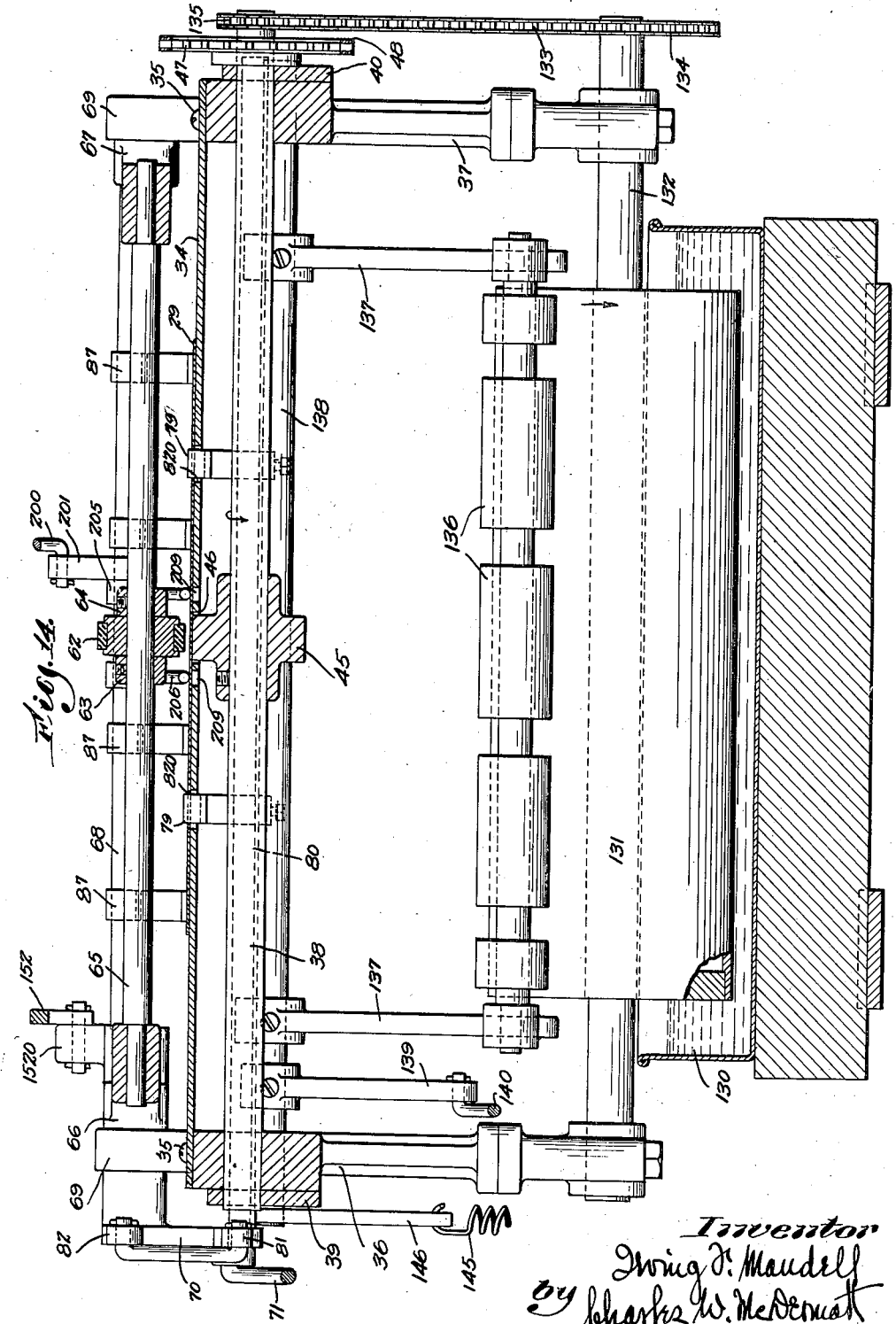

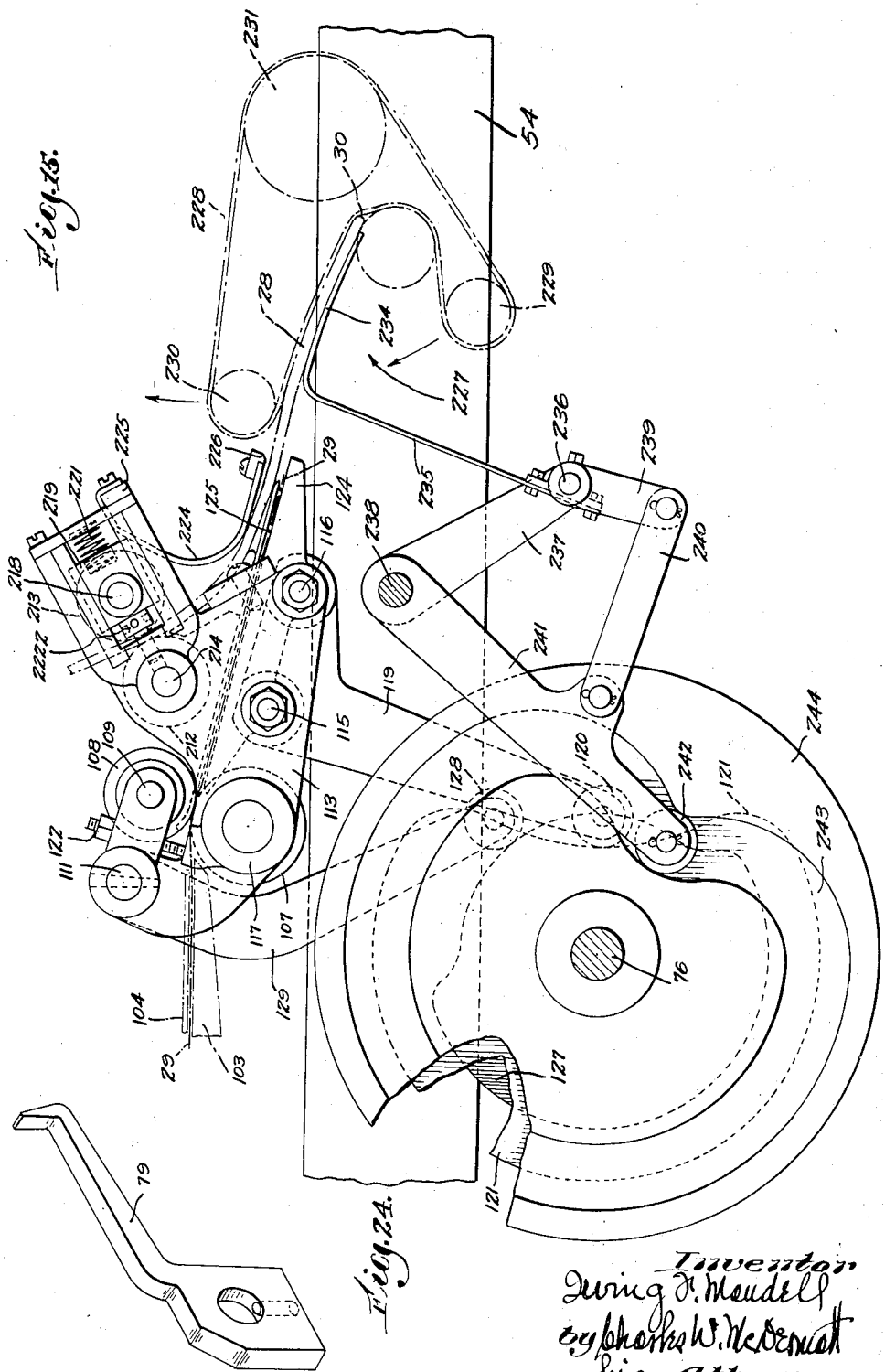

Jan. 8, 1935. I. F. MANDELL 1,987,482
WRAPPING MACHINE
Original Filed Jan. 29, 1931 15 Sheets-Sheet 13
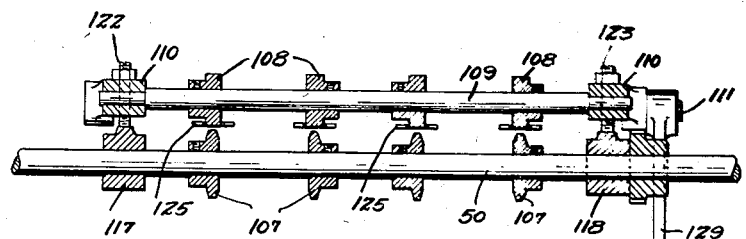
Fig. 16.
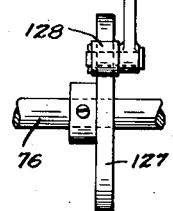
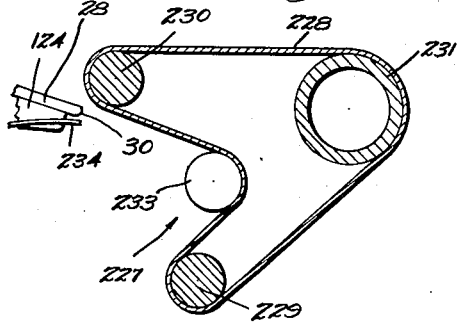
Fig. 17.
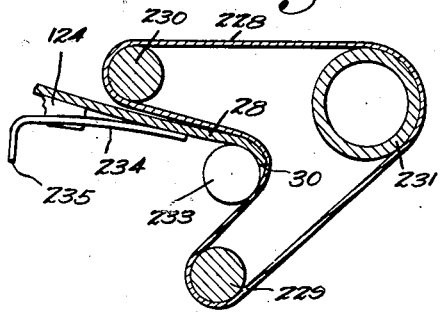
Fig. 18.
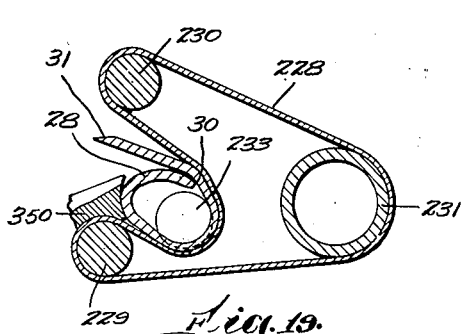
Fig. 19.
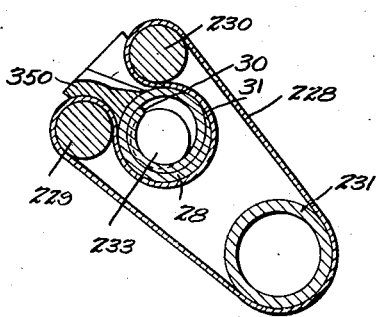
Fig. 20.

Jan. 8, 1935.   I. F. MANDELL   1,987,482
WRAPPING MACHINE
Original Filed Jan. 29, 1931   15 Sheets-Sheet 14
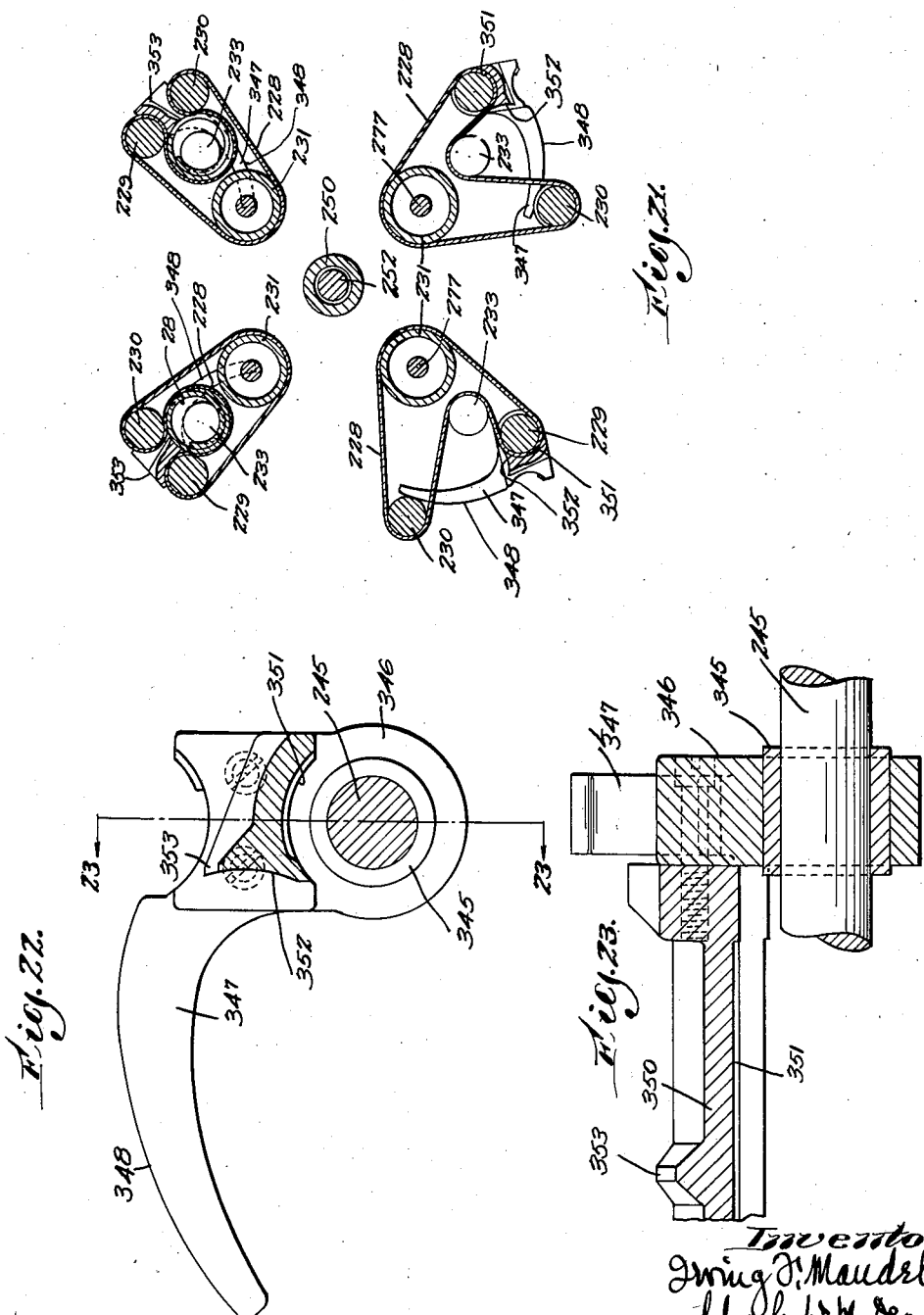

Jan. 8, 1935. I. F. MANDELL 1,987,482
WRAPPING MACHINE
Original Filed Jan. 29, 1931 15 Sheets-Sheet 15
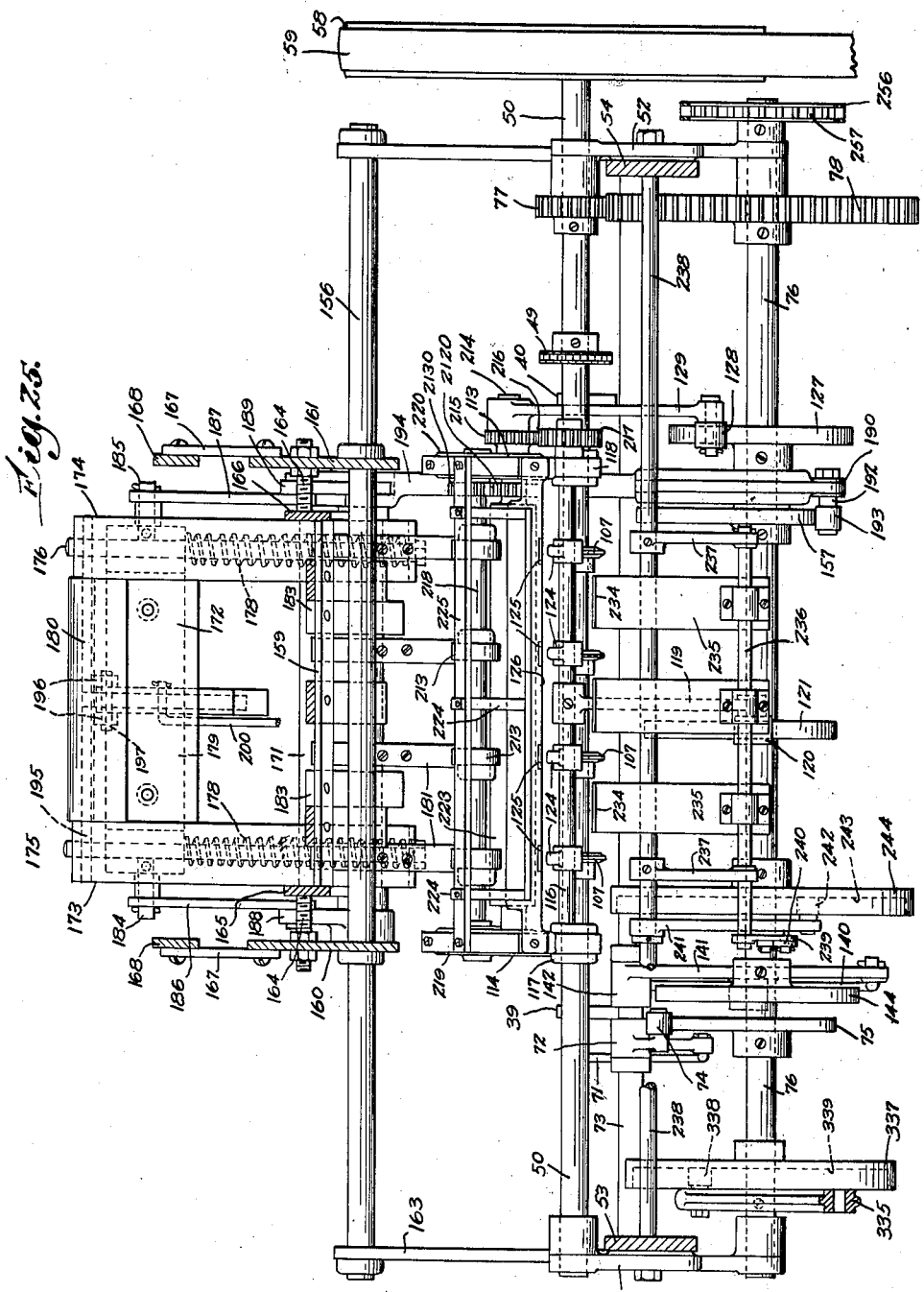

Patented Jan. 8, 1935

1,987,482

UNITED STATES PATENT OFFICE 1,987,482

WRAPPING MACHINE

Irving F. Mandell, Lowell, Mass., assignor to Fred W. Barkley, Winthrop, Mass.

Application January 29, 1931, Serial No. 511,948
Renewed May 25, 1934

43 Claims. (Cl. 270—29)

The present invention relates to machines for convoluting flat material and securing a wrapper around it to prevent its evolution, and more particularly to a machine for rolling a flat publication and securing an addressed wrapper around it to resist the tendency of the rolled publication to spring back into its original flat form and thus prepare it for convenient handling or transmission as by mail.

Many attempts have been made heretofore to produce a commercial machine for rolling and wrapping flat material such as a periodical or other publication. It has been proposed heretofore to form a bight in a travelling band and to use this bight to roll and wrap the publication, but as no means was provided to determine positively the direction in which the leading edge of the publication bent initially in rolling upon itself these machines never made any impression in the art, as the wrapper was as likely to be wrapped around the publication with its addressed face inside as outside.

The principal object of the present invention is to produce a machine for rolling and wrapping flat material by which the leading edge is bent positively in a predetermined direction thus to insure the uniform rolling and wrapping of the material.

To the accomplishment of this object, a feature of the invention contemplates the provision in a machine of the class described having means including an endless band for rolling flat material and a support co-operating therewith, of means for inserting the leading edge of the flat material in between the band and the support to bend the leading edge of the flat material about the support in a predetermined direction.

Broadly considered, the support associated with the band may take any form found desirable or convenient. The support may be the devices for forming the bight in the band, or may be a tool for tucking the leading edge of the flat material against the band to tension the band and cause the tensioned band to bend the leading edge of the flat material about an end of the tucking tool, or the support may be the bight-forming devices and the tucking tool which then acts to tuck the leading edge of the flat material in the space between the band and the bight-forming devices. Preferably the tucking tool, whether or not it acts either alone or with the bight-forming means as the support about which the leading edge of the flat material is bent to determine positively the initial bend thereof, functions to support the flat material and its wrapper during a portion at least of their transfer into the bight in the band.

Another difficulty which militated against the machines, heretofore proposed for rolling and wrapping flat material, from making any impression in the art was that during their operation no means was provided for controlling the tension on the band.

Accordingly, another object of the present invention is to produce a machine of the class described in which the tension on the band is controlled automatically.

To the accomplishment of this object, another feature of the present invention contemplates the provision in a rolling and wrapping machine having a band, means for forming a bight therein, and means for rolling and wrapping flat material in the bight, of automatic means for controlling the tension on the band.

In its broader aspects this feature of the invention contemplates controlling the band to impart the proper degree of tension thereto during the rolling and wrapping operation to cause the bight to resist the tendency of the rolled material to spring back into its flat condition, to slacken the band to facilitate the ejection of the wrapped material from the bight and to tighten the band thereafter to condition the bight for the reception of the flat material to be rolled and wrapped therein.

Other features of the present invention relate to certain devices, combinations and arrangements of parts hereinafter described and then set forth broadly and in detail in the appended claims which possess advantages readily apparent to those skilled in the art.

The various features of the present invention will be readily understood from an inspection of the accompanying drawings illustrating the best form of the invention at present known to the inventor, in which, Figure 1 is a view in right side elevation of the machine for rolling up a publication and securing an addressed paper wrapper around the rolled publication;

Figure 1:
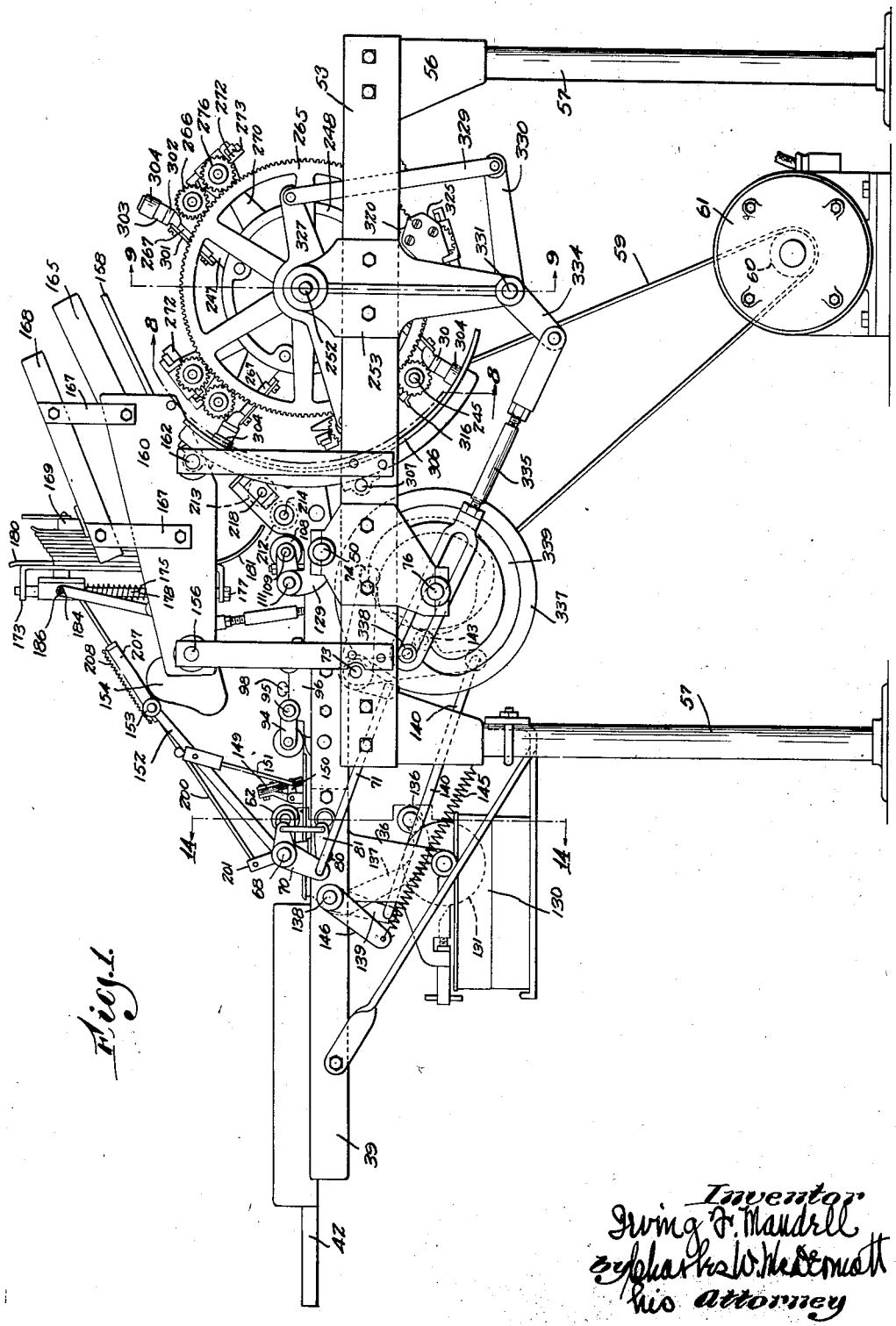
Figure 2:
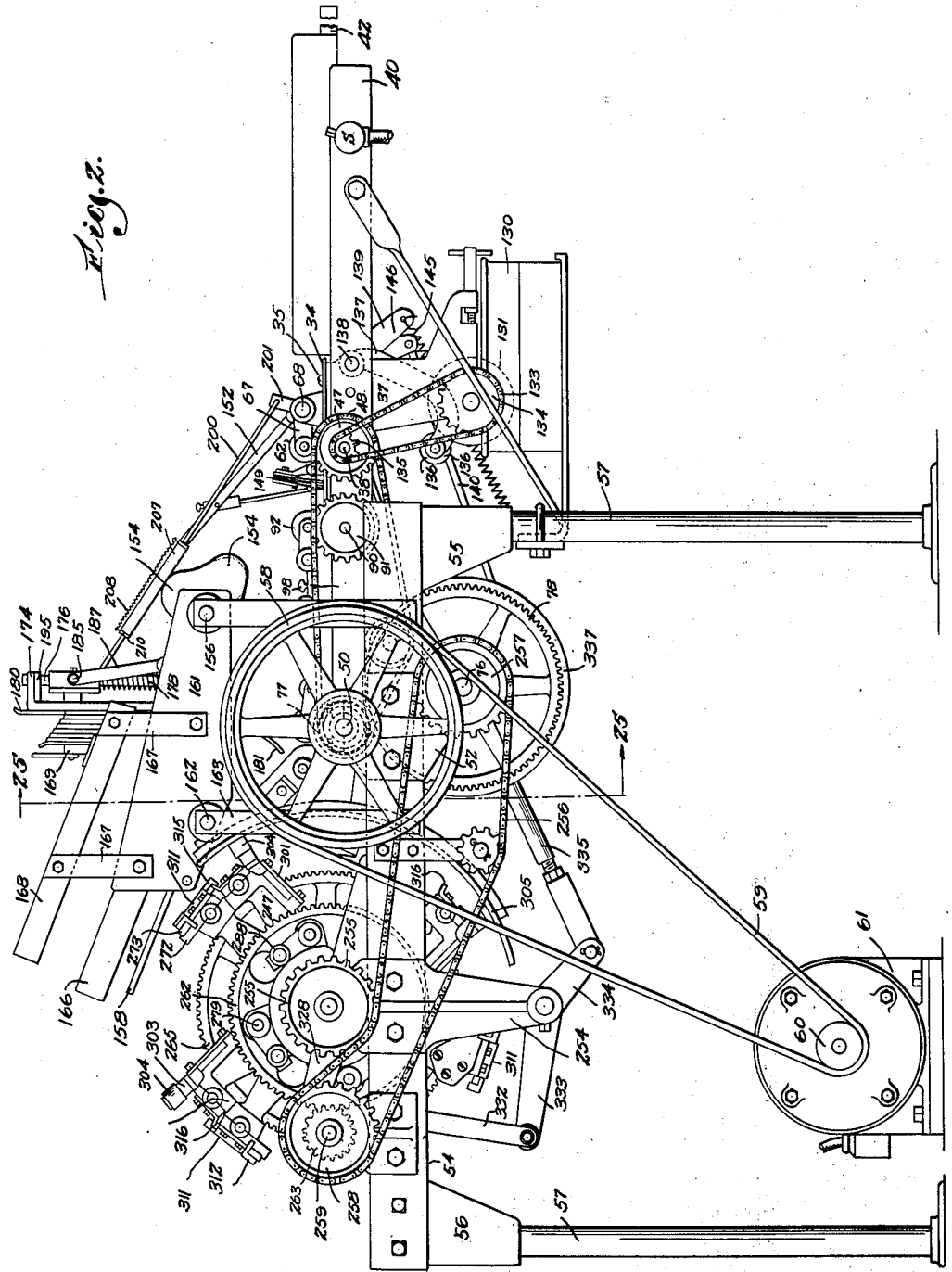
Fig. 2 is a view in left side elevation.
Figure 3:
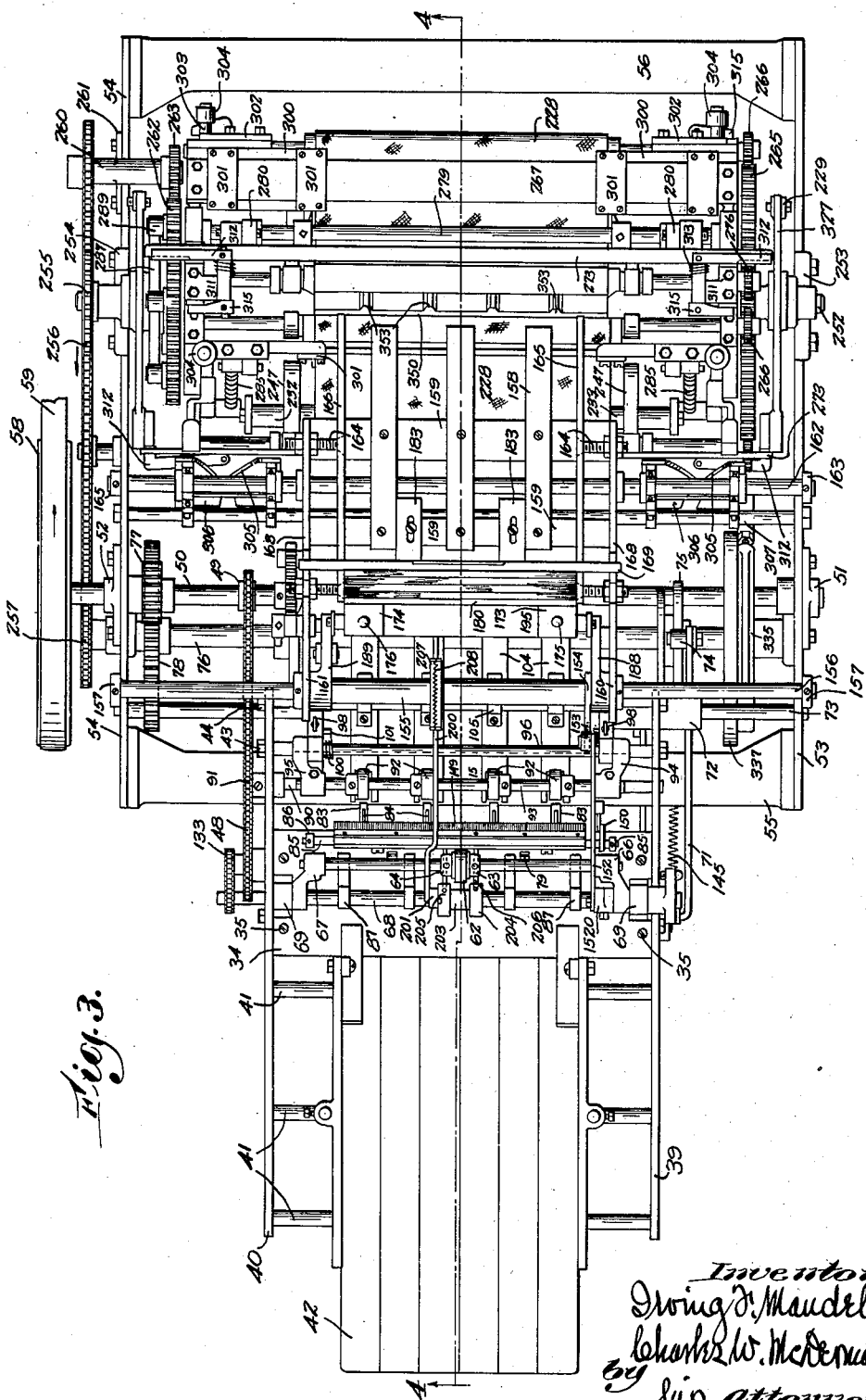
Fig. 3 is a view in plan.
Figure 4:
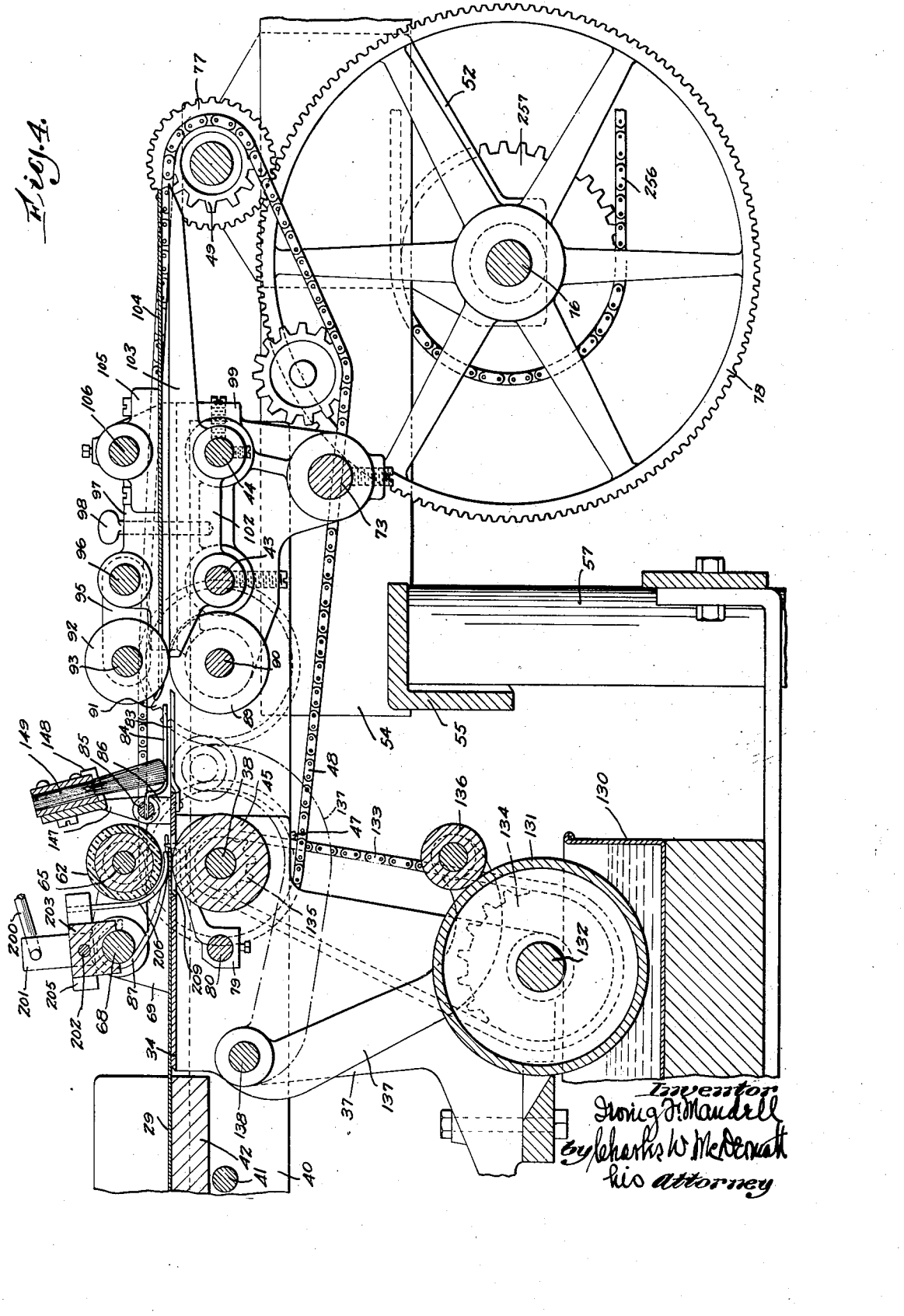
Figure 5:
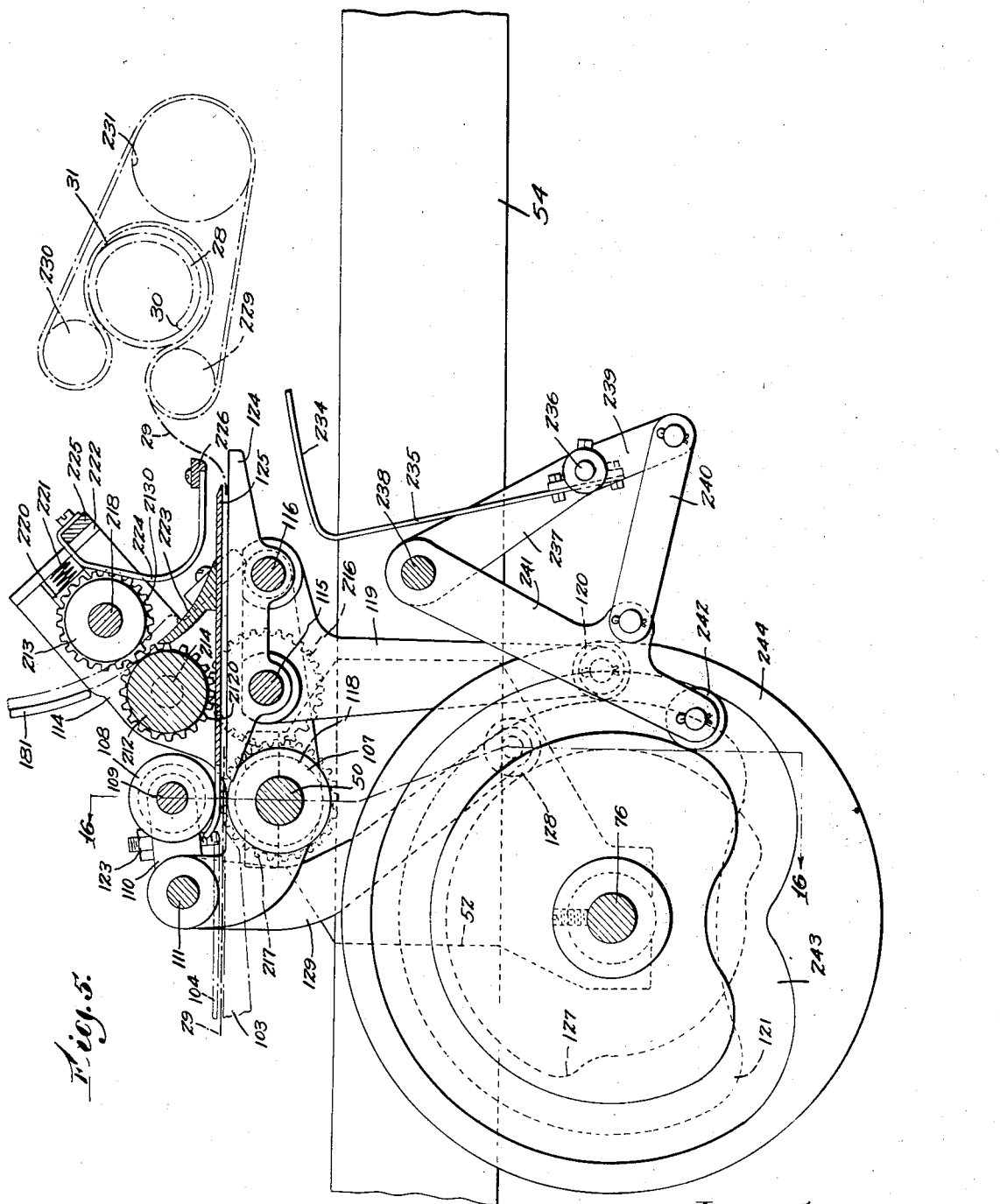
Figure 6:
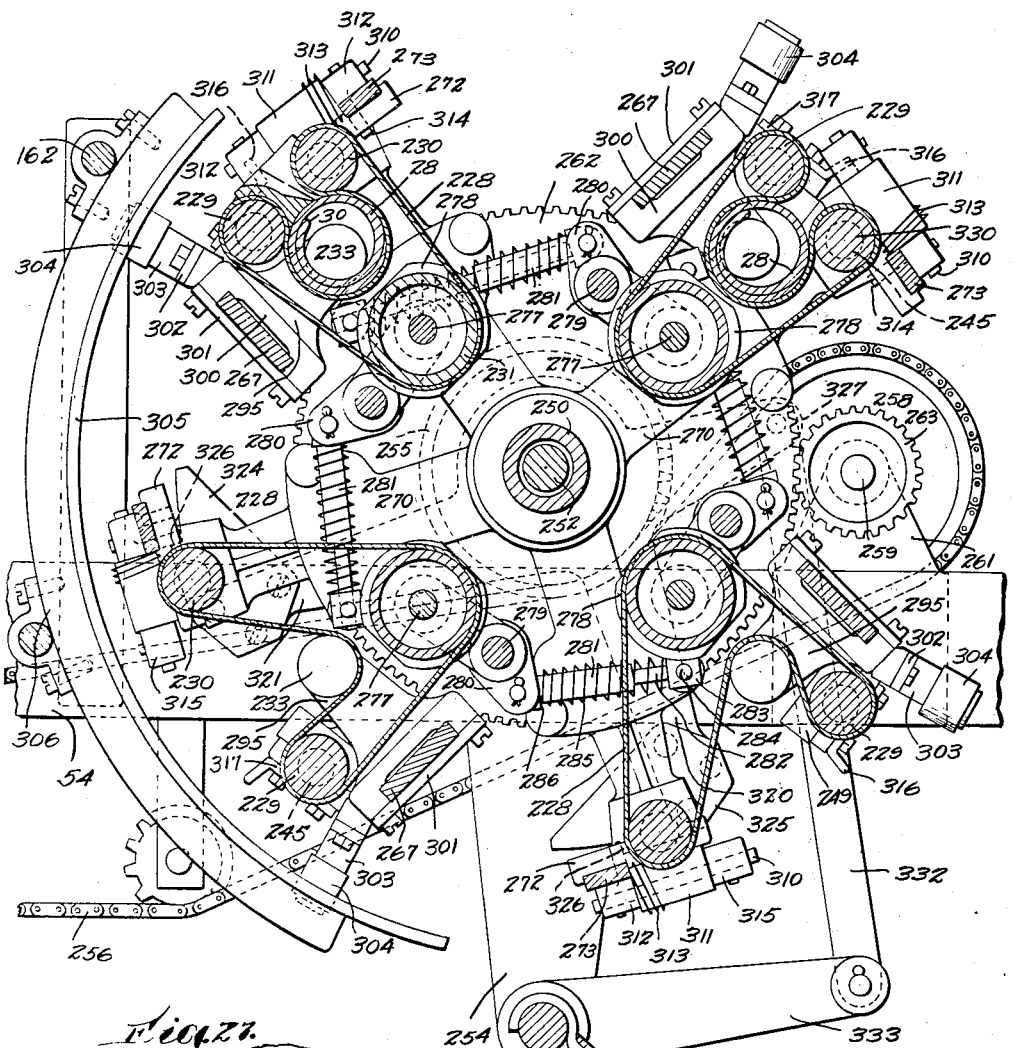
Figure 27:
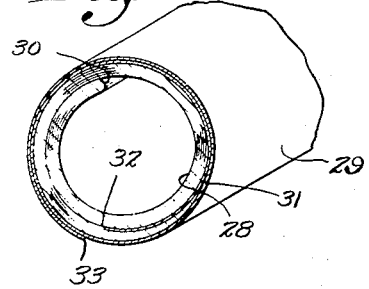

Figs. 4, 5 and 6, collectively, constitute a view in enlarged sectional elevation on the line 4—4, Fig. 3, the position of the rotary carrier being slightly different in Figs. 3 and 6;

Fig. 7 is a detail view in sectional elevation of the magazine in which the publications are stacked, the mechansim for feeding the publications one at a time therefrom, and the feeler mechanism for controlling the operation of the publication feed from one of the wrappers;

Fig. 8 is a view in sectional elevation on the line 8—8, Fig. 1;

Fig. 9 is a view in sectional elevation on the line 9—9, Fig. 1;

Fig. 10 is a detail view in sectional elevation on the line 10—10, Fig. 8;

Fig. 11 is a detail view in sectional elevation on the line 11—11, Fig. 8;

Fig. 12 is a detail view in perspective of the latching and unlatching mechanism for the two band driving roll carriers;

Fig. 13 is a detail view in front elevation of the stationary cam for operating the band bight forming devices;

Fig. 14 is an enlarged view in sectional elevation on the line 14—14, Fig. 1;

Fig. 15 is a detail view in elevation, partly in section, showing another position of the parts illustrated in Fig. 5;

Fig. 16 is a view in sectional elevation on the line 16—16, Fig. 5;

Figs. 17, 18, 19 and 20 are detail views in sectional elevation showing the cycle of operation of one of the bands and the parts associated therewith in rolling the publication and securing a wrapper around the rolled publication;

Fig. 21 is a detail view in sectional elevation of the rotary carrier;

Fig. 22 is a detail view in sectional elevation of the guide for the door which closes the entrance between the band driving rolls into the wrapping space;

Fig. 23 is a detail view in sectional elevation on the line 23—23, Fig. 22;

Fig. 24 (Sheet 12) is a detail view in perspective of one of the stop fingers for engaging the leading edge of the paper wrapper upon its initial insertion into the machine;

Fig. 25 is a view in sectional elevation on the line 25—25, Fig. 2;

Fig. 26 (Sheet 7) is a detail view in sectional elevation of one of the band bight forming devices, and Fig. 27 (Sheet 6) is a detail view in perspective of the rolled and wrapped publication.

The illustrated embodiment of the present invention assembles a publication 28 (Fig. 27) and a paper wrapper 29 and rolls the publication on itself and secures a wrapper around the rolled publication. The publication 28 is superimposed on the wrapper prior to the rolling operation so that the leading and trailing edges 30 and 31 of the publication are in advance of the leading and trailing edges 32 and 33 of the wrapper, respectively. One face of the wrapper 29, adjacent the trailing edge thereof, is provided with adhesive so that the trailing edge may be secured to an adjacent convolution of the wrapper during the rolling operation, thus to hold the publication and its wrapper securely rolled together for mailing.

Described in general terms, the illustrated embodiment of the present invention comprises a rotary carrier provided with four wrapping spaces in which the publication is rolled and wrapped. Each wrapping space comprises a bight in a band which passes around five rolls, two of which are driven rolls, two of which are bight-forming rolls, and one of which is a tension roll. The rotary carrier is driven continuously to transfer each wrapping space successively past an inserting station at which the assembled publication and wrapper are inserted therein. The rotary carrier also transfers the wrapping spaces successively past an ejecting station at which the rolled and wrapped publication is ejected therefrom. The entrance to the two wrapping spaces at the inserting and the ejecting stations, respectively, are open wide to facilitate the insertion of the assembled publication and wrapper into one wrapping space and the ejection of the rolled and wrapped publication from the other. The two wrapping spaces intermediate the inserting and the ejecting stations are closed by a door having a face which co-operates with the band and the two driving rolls therefor to form a hollow cylindrical form in which the publication is rolled and the wrapper secured to the rolled publication. During the rotation of the carrier the position of the tension roll associated with each of the wrapping spaces is controlled automatically so that it may relieve the tension on the band at the ejecting station, increase the tension on the band at the inserting station and control the tension of the other two bands during their operation on the publication. The machine is provided with means for determining positively the initial direction of bend of the leading edge of the publication to insure the uniform rolling of the publications upon themselves, respectively, and the positioning of the wrapper around the rolled publication. The last mentioned means may comprise the bight-forming rolls, a tool for tucking the leading edge of the publication into the bight of the band, or both the bight-forming rolls and the tucking tool. The tucking tool, whether or not it is employed to determine positively the initial direction of bend of the leading edge of the publication, forms a bridge for transferring the publication and the wrapper from a swinging frame, on which the publication and the wrapper are assembled automatically, to the wrapping space at the inserting station. The publications are stacked upended, bound edge down, in a magazine from which they are fed one at a time to the swinging frame, the bridge and the wrapping space. The wrappers, in the illustrated embodiment of the invention, are fed into the machine by hand, but they are fed automatically from the position at which they are located by the hand feeding operative to the swinging frame, bridge and wrapping space. The timing of the publication and wrapper feeds are such that the leading and trailing edges of the publication and of the wrapper upon which the publication is superimposed arrive at the wrapping space successively, respectively. The publication feed is, however, controlled from the wrapper as it is inserted into the machine so that if the operative inadvertently fails to locate a wrapper for the start of the wrapper feed the publication which would be superimposed thereon naturally is prevented from being fed from the magazine until the wrapper therefor is inserted into the machine. The bottom face of the wrapper adjacent its trailing edge is provided with an adhesive so that when the wrapper is wrapped completely around the rolled publication the sticky trailing edge of the wrapper will be rolled in contact with an adjacent convolution thereof. Thus the wrapper prevents the evolution of the rolled publication. Care is taken to apply the adhesive to the wrapper along predetermined portions which are separated to allow the various instrumentalities which co-operate in feeding and guiding the wrapper towards and into the wrapping space to engage the non-sticky portion of the wrapper thus to prevent the operative parts of the machine from becoming smeared.

While it is preferred, in the commercial operation of the machine embodying the features of the present invention, that the wrapper be received automatically from a printing press of the addressograph type, for convenience in disclosure, the present invention is illustrated in connection with a hand feed.

The wrappers are placed one at a time on a flat plate 34 (Figs. 3, 4 and 14) the opposite ends of which are secured by screws 35, respectively, to hangers 36 and 37 which are supported, respectively, by vertically arranged plates 39 and 40. Journaled in the hangers 36 and 37 is a horizontal shaft 38. Adjacent their front ends the plates 39 and 40 are secured together by three tie-rods 41 (Fig. 3) which support a flat table 42. The wrappers, if they are fed into the machine by hand, are stacked in a pile on the table 42 and are fed one at a time therefrom onto the plate 34. Adjacent their rear ends the plates 39 and 40 are secured together by two tie-rods 43 and 44 (Figs. 3 and 4).

Mounted centrally on the shaft 38 (Fig. 14) is a feed roll 45, a portion of the periphery of which projects through a slot 46 in the plate 34 to enable the roll 45 to engage the lower face of the wrapper supported thereby. The shaft 38, outside the plate 40, is provided with a sprocket 47 which is driven by a chain 48 (Figs. 2 and 3) from a sprocket 49 on the main shaft 50 the opposite ends of which are journaled in brackets 51 and 52 (Figs. 1, 2, 3 and 25), secured, respectively, to the side plates 53 and 54 of the main frame. The side plates 53 and 54 (Fig. 3) are connected by horizontal channel irons 55 and 56 supported by the upper ends of four columns 57 (Figs. 1 and 2) the lower ends of which are secured to the floor. The main shaft 50 (Figs. 2 and 3) is provided, outside the bracket 52, with a pulley 58 which is driven in a clockwise direction, viewing Fig. 3, by a belt 59 (Figs. 1 and 2) which passes around the pulley 59 and a small pulley 60 on the armature shaft of an electric motor 61.

In order to withdraw the wrapper 29 from the plate 34 the feed roll 45 co-operates with a rubber-faced roll 62 (Figs. 3 and 14) which is mounted to rotate freely between collars 63 and 64 secured to a horizontal rod 65. The opposite ends of the rod 65 are carried, respectively, by horizontal arms 66 and 67 (Fig. 3) projecting rearwardly from a horizontal rock-shaft 68 journaled in brackets 69 rising from the hangers 36 and 37. The right hand end of the rock-shaft 68 (Fig. 1) is provided with an arm 70 which is linked by a rod 71 to one arm of a bell-crank lever 72 (Figs. 3 and 25) journaled on a tie-rod 73 connecting the side plates 53 and 54. The hub of the bell-crank lever 72 is interposed between a collar on the tie-rod 73 and the outer face of the plate 39. The other arm of the bell-crank lever 72 is provided with a roll 74 which engages the peripheral edge of a cam 75 mounted on a cam-shaft 76 journaled in the brackets 51 and 52. The cam-shaft 76 (Figs. 3 and 25) is driven from the main shaft 50 by a pinion 77 thereon which meshes with a gear 78 on the cam-shaft.

The cam 75 is shaped to hold the roll 62 above the surface of the wrapper 29 in the position shown in Fig. 14 to enable the operative to feed a wrapper 29 onto the plate 34 and position the leading edge of the wrapper against a pair of stop-fingers 79 (Figs. 14 and 24). The stop-fingers 79 are secured to a rock-shaft 80 (Figs. 1 and 14) journaled in the plates 39 and 40. Outside the plate 39 the rock-shaft 80 is provided with an arm 81 (Fig. 1) which is linked to an arm 82 projecting rearwardly from the rock-shaft 68. Thus the roll 62 and the stop-fingers 79 are mounted to move together in the same direction by the cam 75 and to move together in the opposite direction under the influence of gravity.

The wrapper is fed over the plate 34, at a time when the roll 62 is held elevated and the stop-fingers 79 are held projected through openings 820 (Fig. 14) formed in the plate 34, by the cam 75. The stop-fingers 79, by engaging the leading edge of the wrapper 29 hold it stationary against any feeding tendency of the feed roll 45. At the proper time the cam 75, through the connections described, allows the stop-fingers 79 to withdraw, under the influence of gravity, from the path of the wrapper and at the same time allows the roll 62, under the influence of gravity, to drop into engagement with the upper surface of the wrapper, thus starting the feeding of the wrapper from the plate 34 at a predetermined time in the machine's cycle.

In order to guide the wrapper during its feed, the plate 34 (Figs. 3 and 4), near its rear edge, is provided with four thin rearwardly projecting guides 83. Co-operating with each of the guides 83 is a resilient strip or rod 84, the guides 83 and the strips 84 of each set being spaced apart to provide a passageway therebetween for the wrapper. The strips 84 are secured to a rod 85 (Fig. 4) the opposite ends of which are carried by brackets 86 (Fig. 3) secured to the plate 34. During its withdrawal from the plate 34 the wrapper 29 is engaged by four resilient presser feet 87 carried by the rock-shaft 68.

The wrapper 29 is fed by the rolls 45 and 62 from the plate 34 through the passageway, formed by the guides 83 and the strips 84, to a set of four rolls 89 (Fig. 4) mounted upon a horizontal shaft 90 which is journaled in the plates 39 and 40. Outside the plate 40 (Fig. 2) the shaft 90 is provided with a sprocket 91 which is driven by the chain 48 in the same direction and at the same speed as the sprocket 47 on the shaft 38 for the feed roll 45. Co-operating with the rolls 89 are four rolls 92 (Figs. 3 and 4) which are secured to a freely rotatable stub-shaft 93. The opposite ends of the rod 93 are carried by arms 94 and 95, respectively, which project forwardly from the opposite ends of a rock-shaft 96 journaled in blocks 97 removably secured by means of pins 98 to blocks 99 secured to the tie-rods 43 and 44. The rolls 92 are pressed yieldingly into engagement with the rolls 89 by a pair of springs 100 (Fig. 3) each of which is coiled about the rock-shaft 96. One end of each spring 100 is connected by a lateral pin 101 on the block 97. The other ends of the springs 100 are connected, respectively, to the arms 94 and 95. This construction presses the rolls 93 yieldingly towards the rolls 89 and permits the rolls 92 to be swung backwardly out of the way to facilitate access to the rolls 89.

The tie-rods 43 and 44, intermediate the blocks 99, carry four blocks 102 (Fig. 4) the upper surfaces of which form separated guides 103 upon which the wrapper 29 is fed by the rolls 89 and 92. The guides 103 are covered to form a passageway for the wrapper by four brass strips 104 (Figs. 3 and 4) which are carried, respectively, by four blocks 105 secured to a rod 106 connecting the rear ends of the blocks 97. As shown in Figs. 3 and 4 the forward end of each of the strips 104 is yoked to embrace the adjacent roll. These yoked ends are upturned slightly to insure the initial entrance of the wrapper beneath them.

The guides 103 and the strips 104 conduct the wrapper 29 under the influence of the two sets of feed rolls described to a third set of feed rolls 107 and 108, Figs. 5, 15 and 16. The lower feed rolls 107 (four in number) are secured to the main shaft 50. The upper set of feed rolls 108 (four in number) are secured to a freely rotatable shaft 109 (Fig. 16) mounted in bearings formed in two arms 110 projecting rearwardly from a rock-shaft 111 journaled in a swinging frame. The swinging frame comprises vertical plates 113 (Fig. 15) and 114 (Fig. 5) connected by two tie-rods 115 and 116. The side plates 113 and 114 are provided, respectively, with hubs 117 and 118 (Fig. 25) which are loosely mounted on the main shaft 50.

The swinging frame is swung about the shaft 50 (Figs. 5 and 15), for a purpose presently to be described, by an arm 119 one end of which is secured to the tie-rods 115 and 116, and the other end of which is provided with a cam roll 120 arranged to engage the periphery of a cam 121 (Fig. 25) on the camshaft 76. Movement of the rolls 108 toward the rolls 107 under the influence of gravity is limited by adjustable stops 122 and 123 (Figs. 5, 15 and 16) supported by the arms 110 and engageable with the hubs 117 and 118, respectively.

The wrapper 29 is conducted through the swinging frame by four separated guides 124 mounted on the tie-rods 115 and 116 and by four separated strips 125 (Figs. 5, 16 and 25), each strip overlying a guide to form therebetween a passageway for the wrapper. The strips 125 are supported in channels formed on the bottom of a guide bar 126 (Fig. 25) the opposite ends of which are secured to the side plates 113 and 114 of the swinging frame, respectively.

At the time the leading edge of the wrapper is inserted between the rolls 107 and 108, the rolls 108 are held in an elevated position by a cam 127 (Figs. 5, 15, 16 and 25) on the cam-shaft 76. The periphery of the cam 127 is engaged by a roll 128 carried by one end of an arm 129, the other end of which is secured to the rock-shaft 111. When the leading edge of the wrapper reaches the position illustrated in Fig. 5, the trailing edge of the wrapper has passed through the rolls 89 and 92. As the rolls 108 are held in an elevated position by the cam 127 the wrapper 29 is brought to rest momentarily. The feed of the wrapper is recommenced when the cam 127 allows the rolls 108 to drop under the influence of gravity upon the wrapper 29. This restart of the feed of the wrapper is timed with the feed of the publication from the magazine, presently to be described, so that the publication may be superimposed upon the wrapper with the leading and trailing edges of the publication in advance of the corresponding edges of the wrapper, respectively.

After the trailing edge of the wrapper 29 passes beyond the influence of the rolls 45 and 62, but before it reaches the rolls 89 and 92, adhesive is applied to the lower face of the wrapper in the region of its trailing edge so that when the wrapper is wrapped about the rolled publication the trailing edge of the wrapper may be secured to an adjacent convolution thereof in order to prevent the evolution of the rolled publication.

In order to apply the adhesive to the bottom face of the wrapper 29 adjacent its trailing edge the front columns 57 support a tank 130 (Figs. 1, 2, 3, 4 and 14) for a liquid adhesive. Mounted to rotate in the tank 130 (Figs. 4 and 14) in engagement with the adhesive is a hollow cylinder 131 which is secured to a horizontal shaft 132 journaled in the bottom ends of the hangers 36 and 37. The cylinder 131 is rotated in the adhesive by a chain 133 which passes around a sprocket 134 on the shaft 132 and a sprocket 135 on the shaft 38. The adhesive picked up by the periphery of the cylinder 131 is transferred therefrom to the lower face of the wrapper in the region of its trailing edge by a roll 136 having four gaps therein.

The opposite ends of the roll 136 are provided with bearings (Fig. 14) which are freely rotatable in arms 137 secured to and depending from a rock-shaft 138 journaled in the hangers 36 and 37. Just inside the hanger 36 the rock-shaft 138 is provided with an arm 139 (Fig. 1) which is connected by a link 140 to an arm 141 (Figs. 1 and 25) depending from a hub 142 rotatably mounted on the tie-rod 73 between the inner face of the plate 39 and a collar on the tie-rod. The arm 141 is provided with a roll 143 (Fig. 1) which engages the periphery of a cam 144 on the cam-shaft 76. The roll 143 is held engaged with the periphery of the cam 144 by a coiled spring 145 (Figs. 1 and 14) one end of which is secured to the main frame and the other end of which is secured to a second arm 146 on the rock-shaft 138 outside the hanger 36.

As shown in Fig. 4 the roll 136 is swung upwardly from the full line position to the construction line position to transfer adhesive from the surface of the cylinder 131 to the bottom face of the wrapper 29 in the region adjacent its trailing edge. The roll 136 engages the bottom face of the wrapper 29 in the space between the rear end of the plate 34 occupied by the guides 83 and the strips 84 and the front ends of the guides 103 and the strips 104 (Figs. 3 and 4). The purpose of the gaps in the roll 136 is to keep the adhesive away from the portion of the wrapper 29 engaged by the guides 83, 103 and 124 and by the feed rolls 89 and 107. The adhesive is spaced from the trailing edge of the wrapper a distance sufficient to prevent the adhesive from being squeezed out from beneath the edge during the rolling operation.

In order to provide the upper face of the wrapper 29 with a yielding abutment to resist the blow of the roll 136, the rod 85 (Fig. 4) supports rotatably two upstanding arms 147 which carry between them a horizontal support 148 for a brush 149 extending across the full width of the wrapper 29. The brush 149 is swung downwardly against the upper side of the wrapper 29 at the same time the roll 136 is swung upwardly against the lower face of the wrapper.

To this end the right hand arm 147 is provided with a horizontal extension 150 (Fig. 1) which is pivotally connected to one end of a link 151 the upper end of which is pivotally connected in an adjustable manner to an arm 152. One end of the arm 152 is pivotally connected to a collar 1520 on the rock-shaft 68. The other end of the arm 152 is provided with a roll 153 (Fig. 1) engaged with a cam plate 154 carried by a sleeve 155 (Fig. 7). The sleeve 155 is mounted to rock on a tie-rod 156 the opposite ends of which are secured to brackets 1570 carried by the side plates 53 and 54. The sleeve 155 is oscillated to swing the brush 149 downwardly against the wrapper 29 during the pasting operation by a cam 157 on the cam-shaft 76 through connections presently to be described. The cam 154 is provided with a depression (Fig. 1) intermediate two rises. When the roll 153 is engaged with either rise the brush 149 is elevated away from the path of the wrapper. When the roll 153 is engaged with the depression the brush is swung downwardly into the path of movement of the wrapper. The brush 149 is swung downwardly against the upper side of the wrapper twice during each cycle of operation, but in one of these movements the roll 136 is engaged with the cylinder 131 and therefore this particular swinging movement of the brush 149 is functionless.

As so far described, the wrapper has been fed from the plate 34 to bring its leading edge just beyond the feed rolls 107 and 108. The manner of superimposing the publication 28 on the wrapper 29 so that the leading and trailing edges 30 and 31 of the publication will be in advance of the corresponding edges 32 and 33 of the wrapper 29, respectively, will now be described.

The publications to be rolled and wrapped are stacked upended with the bound end thereof directed downwardly in a magazine comprising three spaced floor-boards 158 (Figs. 3, 7 and 25) which are directed forwardly and downwardly and are secured to two cross-boards 159 carried by two side-plates 160 and 161 supported at their front ends by the tie-rod 156 and at their rear ends by a tie-rod 162. The opposite ends of the tie-rod 162 are supported by brackets 163 secured to the side frames 53 and 54. The side-plates 160 and 161 carry a pair of adjustable screws 164 connected, respectively, to spaced side-boards 165 and 166. Each of the side-plates 160 and 161 carry vertical arms 167 which support elevated rails 168 directed forwardly and downwardly.

The upended stack of publications in the magazine is pressed forward by two weights 169 and 170 (Fig. 7). The weight 169 slides downwardly against the stack of publications on the rails 168. The weight 170 slides downwardly against the stack of publications on the floor boards 158. The weights 169 and 170 press the stack of publications against two cross-plates 171 and 172. The cross-plate 171 is secured to the side-boards 165 and 166. The plate 172 slides vertically in ways formed by vertical plates 173 and 174 secured to the cross-plate 171. The upper and lower ends of the plates 173 and 174 are bent forwardly as shown in Fig. 7 to support vertical rods 175 and 176, respectively, each of which is secured to the lower ends of the plates by a nut 177 (Figs. 7 and 25) on its lower end. Coiled around each of the rods 175 and 176 is a spring 178 which is interposed between the lower end of the adjacent vertical plate and a third cross-plate 179 through which the rods 175 and 176 pass loosely. The plate 179 is connected to the cross-plate 172 as shown in Figs. 1, 2, 7 and 25. Mounted on the back of the plate 172 is a feeding plate 180 the lower end of which engages the end of the forward upended publication in the magazine.

Connected to the back face of the plate 171 are four guides 181 (Figs. 7 and 25) which are bent rearwardly and downwardly to form a chute for the publication discharged from the magazine.

The upended publication in the magazine engaged by the feeding plate 180 is fed thereby out through an orifice 182 (Fig. 7) formed between the guides 181 and two blocks 183 (Figs. 3, 7 and 25) secured to the forward cross-board 159. The position of the blocks 183 on the forward cross-board 159 may be varied thus to vary the width of the orifice 182 to accommodate the magazine for the discharge of publications of different thicknesses.

In order to reciprocate the feeding plate 180 vertically and thus discharge a publication out through the orifice 182 to the chute formed by the guides 181, the cross plate 179 (Figs. 7 and 25) is provided with two lateral pins 184 and 185 to which are pivoted, respectively, the upper ends of links 186 and 187. The lower ends of the links 186 and 187 are pivoted, respectively, to arms 188 and 189 projecting rearwardly from the sleeve 155. The sleeve 155 is rocked from the cam 157 on the cam-shaft 76 by a longitudinally adjustable rod 190 (Fig. 7) the lower section of which is provided with a slot 191 which embraces the cam-shaft 76 to guide the rod 190 during its reciprocation. The lower section of the arm 190 is provided with a lateral pin 192 upon which a roll 193 is journaled. The roll 193 engages the periphery of the cam 157. The rod 190 is provided with a turn-buckle 194 to provide for its longitudinal adjustment. It will be understood that when the sleeve 155 is oscillated by the cam 157 the feeding plate 180 is reciprocated vertically downward to feed one of the publications out of the magazine and the cam plate 154 (Fig. 1) is oscillated to engage the brush 149 with the wrapper 29.

In order to prevent the needless feeding of a publication from the magazine in the accidental event that the plate 34 is not provided with a wrapper the upper forwardly bent ends of the plates 173 and 174 support a cross-plate 195 (Fig. 7) provided with depending ears 196. The ears 196 support a pivot pin 197 for a depending latch 198 provided with a shoulder 199. The latch 198 is connected by a sectional rod 200 to an arm 201 projecting upwardly from a horizontal pin 202 rotatably mounted in a block 203 secured to the rock-shaft 68. The pin 202 also carries two supports 204 and 205 (Fig. 3) each of which carries a feeler 206. The feelers 206 project downwardly and rearwardly upon opposite sides of the rolls 45 and 62 (Figs. 3 and 4). The free ends of the upper section of the rod 200 are housed in a sleeve 207 secured only to the lower section of the rod. The two sections of the rod 200 are connected by a coiled spring 208 as shown in Fig. 7.

With this construction the feelers 206 ride over the wrapper 29 on the plate 34 and hold the latch 198 in the position of Fig. 7. If the operative should fail to place a wrapper upon the plate 34 during the continued operation of the machine the feelers 206 drop, under the influence of gravity, down through openings 209 (Fig. 14) in the plate 34, thus rocking the arm 201 through the connections described to the right (Fig. 7). During this movement of the rod 200 the sleeve 207 engages the nut 210 on the upper section of the rod 200 and swings the latch 198 to position the shoulder 199 thereon over the top of the cross-plate 179 at the bottom of the feeding stroke of the plate 180. The latch 198 is held engaged with the top of the plate 179 by a leaf spring depending from the plate 195. With this construction after a publication is fed out of the magazine, if the machine is not provided with a wrapper for the next publication to be fed from the magazine, the feeding plate 180 is prevented from returning to its extreme elevated position under the influence of the springs 178. The feeding plate 180 is not unlocked until a wrapper 29 is placed upon the plate 34.

As indicated in Fig. 1 the roll 153 is engaged with a rise on the cam 154 when the feeding plate 180 is in its extreme upper movement and also when it is locked from movement upwardly. The latch 198 therefore holds the brush 149 upwardly out of the path of movement of the wrapper. In consequence, when no wrapper is in place beneath the brush 149, the adhesive roll 136 may be actuated upwardly without it engaging the brush 149 and smearing it with adhesive.

The shoulder 199 engages the upper edge of the plate 179 after it has reached its limit of stroke downwardly and is being returned to its limit of stroke upwardly by the tensioned springs 178. If a wrapper 29 is now placed in position on the plate 34 the feelers 206 engaged thereby rock the arm 201 to the left thus withdrawing the shoulder 199 from the path of movement of the plate 179. As the plate 179 at that time is withdrawn downwardly away from the shoulder 199 by the cam 157, withdrawal of the latch 198 from the path of the plate 179 in its upward movement subjects the connections from the feelers 206 to a light duty.

In order to relieve the wrapper placed on the plate 34 from the duty of lifting the feelers 206 out of the openings 209, the block 203 carries a laterally projecting pin 211 which limits the movement of the feelers in dropping into the openings 209 and forces the feelers 206 to partake of the rocking movement of the rock-shaft 68. When the rock-shaft 68 is rocked to the left (Fig. 7) to elevate the feed roll 62 the feelers 206 are rocked upwardly. If now a wrapper 29 is slid beneath the feelers 206 into position on the plate 34 the pressure exerted by the feelers on the wrapper is light. If no wrapper is placed in position on the plate 34 the feelers 206 drop down into the openings 209 when the rock-shaft rocks in a direction to lower the feed roll 62 down upon the feed roll 45. However, the feelers 206 do not drop into the slots 209 every time a wrapper is withdrawn from the plate 34 because, as the wrapper is being withdrawn, the operative inserts another wrapper in position on the plate 34 beneath the wrapper being withdrawn.

The publication fed out of the magazine is delivered by the guides 181 to a set of feed rollers 212 and 213 (Figs. 5 and 15). The feed rolls 212 (four in number) are secured to a horizontal shaft 214 journaled in the side plates 113 and 114. The shaft 214 is provided with a gear 215 (Fig. 25) which meshes with a gear 216 on the tie-rod 115. The gear 216 is driven by a gear 217 (Fig. 5) on the main shaft 50.

The feed rolls 213 (four in number) are secured to a horizontal shaft 218 journaled in rectangular bearings 219 and 220 (Fig. 25) which slide in ways formed in the side plates 111 and 112, respectively. A coiled spring 221 (Fig. 5) is interposed between each of the bearings 219 and 220 and a cover plate 222 secured, respectively, to the side plates 113 and 114. The movement of the bearings 219 and 220 under the influence of the springs 221 is limited by the heads of adjustable screws 2222 threaded, respectively, into the hubs on the plates 113 and 114 for the opposite ends of the shaft 214. The shaft 214 is provided with a gear 2120 (Fig. 25) which meshes with a gear 2130 on the shaft 218.

After the leading edge of the publication passes beyond the feed rolls 212 and 213 it is engaged by a curved plate 223, projecting upwardly and forwardly from the guide bar 126 (Figs. 5 and 25), which conducts the publication to the upper surface of the strips 125. Co-operating with the strips 125 to form a passageway for the publication are three bent strips 224 having their upper ends secured to a bar 225 carried by the cover plates 222. The lower ends of the strips 224 support a horizontal straight edge 226 which is unconnected to the side plates 113 and 114. The upper faces of the strips 125 and the lower face of the straight edge 226 form between them a passageway through which the publication is fed out of the swinging frame.

Referring to Fig. 15, after a considerable portion of the publication has been fed by the rolls 212 and 213 out of the passageway between the strips 125 and the straight-edge 226, the cam 127 permits the rolls 108 to drop upon the wrapper positioned upon the guides 124 and thus co-operate with the rolls 107 to feed the wrapper out of the passageway between the guides 124 and the strips 125 into engagement with the bottom face of the publication. Stated in another way, the leading edges of the publication and the wrapper are fed out of the swinging frame (Figs. 5 and 15) successively in order that the publication may be superimposed upon the wrapper with the leading and trailing edges of the publication in advance of the corresponding edges of the wrapper, respectively.

From the swinging frame the superimposed publication and wrapper are delivered to a wrapping space 227 (Fig. 15) formed by a band or broad belt 228. The band is supported by two elongated cylindrical driving rolls 229 and 230, an elongated cylindrical idler or tension roll 231, and two short cylindrical rolls 232 and 233 (Figs. 8 and 9) which form a re-entrant bight in the band 228. The rolls 232 and 233 normally engage the band 228 close to the side edges thereof out of the path of movement of the publication. That is, the bight in the band is loose across the width of the publication inserted into the wrapping space. The entrance into the wrapping space 227 extends between the two driving rolls 229 and 230.

At the time the superimposed publication and the wrapper are inserted into the wrapping space 227, the cam 121 has swung the swinging frame downwardly (Fig. 15) and is holding it in a stationary position. The roll 230 is held stationary in a manner presently to be described while the roll 229 is moving upwardly as indicated by the arrow, Fig. 15. The elongated mouth to the wrapping space 227 is wide open to permit the superimposed publication and wrapper to pass freely therethrough into the wrapping space 227.

In order to support the superimposed publication and wrapper during their transfer from the swinging frame into the wrapping space 227, the illustrated embodiment of the present invention is provided with a movable bridge comprising three separate flat supports 234 (Figs. 5, 15 and 25) integral, respectively, with arms 235 which are secured to a rock-shaft 236. The opposite ends of the rock-shaft 236 are journaled in arms 237 (Fig. 25) which project downwardly and forwardly from a tie-rod 238 connecting the side plates 53 and 54. One end of the rock-shaft 236 is provided with an arm 239 which is connected through a link 240 with an arm 241, the upper end of which is loosely mounted on the tie-rod 238. The lower end of the arm 241 is provided with a roll 242 engaged with a groove 243 formed in one face of a cam 244 on the cam shaft 76. Through the connections described the supports 234 are swung as a unit from the position shown in Fig. 5 to that shown in Fig. 15 to form a bridge and support the superimposed publication and wrapper during a portion at least of their transfer from the swinging frame to the wrapping space 227.

The supports 234 are constructed to press the leading edge of the publication against the band 228 to flex it upwardly into a tensioned position (Fig. 15). The leading edge of the publication is thus pinched between the supports 234 and the tensioned band 228 resulting in the bending of the leading edge of the publication downwardly about the rear ends of the supports by the tensioned band 228 when the leading edge of the publication is fed off the supports 234. The direction of the bend of the leading edge of the publication is thus determined positively so that the uniform rolling of the publications upon themselves, respectively, and the wrapping of the rolled publications in the manner illustrated in Fig. 27 is insured.

The band driving roll 229 is integral with a shaft 245 (Figs. 6 and 10) the opposite ends of which are each supported by a half-bearing 246 formed in a radial extension 247 of a hub 248. Co-operating with the half-bearing 246 is a bearing cap 249 bolted to the half-bearing 246. The two hubs 248 (Fig. 9) are secured to a hollow sleeve 250 rotatably mounted on cylindrical bearings 251 interposed between the internal surface of the sleeve 250 and a horizontal shaft 252. The opposite ends of the shaft 252 are journaled in brackets 253 and 254 secured respectively to the side plates 53 and 54. Outside the bracket 254 the shaft 252 is provided with a sprocket 255 which is driven by a chain 256 (Figs. 2 and 3) from a sprocket 257 on the cam-shaft 76. The chain 256 also drives a sprocket 258 on one end of a stub shaft 259 which is supported in a long bearing 260 (Fig. 3) carried by a bracket 261 on the side plate 54.

The sleeve 250 carries a gear 262 (Figs. 2 and 9) which meshes with a gear 263 on the end of the stub-shaft 259. The shaft 252 is provided with a gear 265 (Figs. 2 and 9) which drives a pinion 266 (Fig. 8) on one end of the shaft 245 for the roll 229. The extension 247 on the hub 248 on one side of the machine is connected to the extension 247 on the hub 248 on the other side of the machine by a plate 267 (Fig. 6). As shown in Fig. 2 the sprockets 255 and 258 are the same size and consequently the shafts 252 and 259 are driven at the same speed in opposite directions. However, the pinion 263 reduces the speed transmitted to the gear 265 and reverses the direction of rotation thereof so that the sleeve 250 runs in the same direction as the shaft 252 but at one-fourth its speed. The roll 229 is thus driven in a counter clockwise direction, viewing Fig. 15, at the same time it is rotated bodily about the axis of the shaft 252 in a clockwise direction.

The band driving roll 230 (Fig. 15) is integral with a shaft 268 (Fig. 10) the opposite ends of which are each supported by a half-bearing 269 formed on one end of an arm 270 having a hub 271 (Fig. 9) rotatably mounted on the sleeve 250. Co-operating with the half-bearing 269 is a bearing cap 272 (Fig. 1) bolted to the half-bearing 269. The pair of arms 270 are connected to move as a unit on the sleeve 250 by a bar 273 which rests in a channel 274 formed in the cap 272. The bar 273 is secured to the bottom of the channels 274 in the caps 272 by screws 275 (Fig. 12).

The shaft 268 is provided with a pinion 276 which meshes with the gear 265 so that the roll 230 may be rotated, like the roll 229, in a counter clockwise direction, viewing Fig. 15, about the axis of the shaft 252.

As shown particularly in Fig. 10 each hub 248 is provided with four radial extensions 247. The corresponding extensions 247 on the hubs 248 are connected together by four plates 267. As shown particularly in Fig. 9 the sleeve 250 supports eight hubs 271 for the arms 270, there being four of the hubs 271 adjacent a hub 248 on one side of the machine, and four of the hubs 271 adjacent the other hub 248 on the other side of the machine. The machine is thus provided with four driving rolls 229, four driving rolls 230, and four bands 228, one band being associated with a set of driving rolls comprising a roll 229 and a roll 230. The machine is provided also with four tension rolls 231 (Fig. 15) and eight bight-forming rolls 232 and 233, there being one tension roll 231 and two bight-forming rolls 232 and 233 associated with a set of driving rolls 229 and 230 and a band 228. The machine is thus provided with four wrapping spaces 227. As shown in Fig. 6 one wrapping space 227 is in a position to receive a publication and its wrapper, hereinafter called the receiving station, from the swinging frame by way of the arms 234 (Fig. 15), two of the other wrapping spaces 227 are engaged in rolling a previously inserted publication and wrapper into the form illustrated in Fig. 27, and the fourth wrapping space 227 is in a position to eject the rolled and wrapped publication, hereinafter called the ejecting station, from the machine.

The roll 231 (Fig. 15) is rotatably mounted on a rod 277 (Fig. 6) the opposite ends of which are carried by arms 278 (Fig. 9) secured to a rock-shaft 279. The opposite ends of the rock-shaft 279 are journaled in the hubs 248. Between each hub 248 and each arm 278, the rock-shaft 279 is provided with a clamp 280 (Figs. 6 and 9) to one end of which is pivoted a sleeve 281. The sleeve 281 telescopes over one end of a rod 282 the other end of which is secured to a block 283 rotatably mounted on a pin 284 projecting laterally from the arm 270.

The roll 231 is held in engagement with the band 228 by a spring 285 coiled about the sleeve 281 and the rod 282 and interposed between the block 283 and a shoulder 286 on the sleeve 281. During the operation of the machine the desired tension of the roll 231 on the band 228 is controlled automatically by a stationary cam 287 (Fig. 11). The cam 287 is made in two parts which, after being slipped into place and secured on the cylindrical bearing for the shaft 252 in the bracket 254 (Fig. 9), are secured together by bolts 288 (Fig. 11). Engaged with the cam 287 are four cam rolls 289 each of which is journaled in one end of an arm 290 secured to one end of the four rock-shafts 279. With this construction the springs 285 hold the rolls 289 in engagement with the periphery of the stationary cam 287 during the transfer of the rolls 289 around the cam. As described particularly hereinafter the cam 287 is provided with a depression, to permit one of the springs 285 to move its associated tension roll 231 in a direction to tighten the band 228 after it has arrived at the receiving station and after the material to be rolled and wrapped has been inserted into the bight, and with a rise, to rock one of the shafts 279 to slacken the band 228 momentarily when it arrives at the ejecting station. When the bands 228 are intermediate the inserting and ejecting stations, the cam 287 controls automatically the desired tension on the band 228 required to prevent the evolution of the rolled publication or to resist the tendency of the rolled publication to spring back out of its spiral form.

The bight-forming rolls 232 and 233 (Figs. 8 and 9) comprise short hollow cylinders 291 (Fig. 26). They are provided with internal shoulders 292 which are engaged by self-contained ball-bearings 293 carried by a stud 294 projecting laterally from an arm 295 and secured thereto by a nut 296. The ball-bearings are held engaged with the shoulders 292 by a shoulder nut 298 which is threaded on one end of the stud 294 into engagement with the internal race of the adjacent ball-bearing in which position the shoulder nut 298 is secured by a locking washer 299 which is pressed against the shoulder nut 298 by a machine screw 2990 threaded into the free end of the stud 294. The arms 295 are secured to channel bars 300 which embrace the plate 267, the bars being held in engagement with the plate 267 by a pair of cover plates 301 extended across the plate 267 and secured to the channel bars 300.

In order to determine positively the initial bend of the leading edge of the publication, either independently of or in conjunction with, the supports 234, the channel bars 300 are provided with a plate 302 (Fig. 9) having a projecting support 303 for a rotatable roll 304. The rolls 304 for the bight-forming rolls 232 and 233 are arranged respectively to travel in independent cam paths 305, one cam path being located on one side of the machine and the other cam path being located in the other side of the machine (Fig. 3). Each cam path 305 (Fig. 13) is formed in a stationary cam 306. The cam 306 is constructed in two parts, both of which depend from the tie-rod 164. Both parts of the cam 305 are supported also by a tie-rod 307 connecting the side-plates 53 and 54. The two parts of the cam 305 are held together in the proper spaced relation by braces 308.

Normally, the bight-forming rolls 232 and 233 occupy the full line position of Fig. 8. If they are held in that position at the time the publication is inserted into the wrapping space, as they may be, by removal of the plates 302, the opposite sides of the publication clear the free ends of the bight-forming rolls. The cam paths 305 are formed to engage the rolls 304 during the movement of a wrapping space into position to receive the publication from the arms 234 and slide the two channel bars 300 inwardly or towards each other on the plate 267, thus to move the bight-forming rolls into the construction line position of Fig. 8. The rolls 232 and 233 are then positioned in the path of movement of the leading edge of the publication so that it may enter the space between the band 228 and the bight-forming rolls and tension the band in doing so to cause it to bend the leading edge of the publication about the bight-forming rolls, thus to determine positively its initial bend (Fig. 18).

The leading edge of the publication may be bent positively in a predetermined direction by the bight-forming rolls 232 and 233 or by both the rolls and the supports 234. When the bight-forming rolls 232 and 233 are relied upon alone to bend the leading edge of the publication, the supports 234 may be used only to form a bridge for the transfer of the publication and its wrapper across the space between the swinging frame and the wrapping space, or as a bridge and a tool to tuck the leading edge of the publication into the space between the band 228 and the bight-forming rolls. The arms 234 may, in addition to their bridging and tucking functions, co-operate with the bight-forming rolls to bend the leading edge of the publication in a predetermined direction. By removing the plates 302 the bight-forming rolls 232 and 233 may be maintained in their full line position of Fig. 8 and reliance placed solely on the supports 234 to bend the leading edge of the publication positively in a predetermined direction. Referring to Fig. 11 the cam 287 is provided with a depression 309 to allow the roll 231 to exert tension on the band after the leading edge of the publication is inserted between the band and the bight-forming rolls.

As shown particularly in Fig. 6 the fixed and movable supporting arms for the rolls 229 and 230 associated with the bands 228 at the inserting and ejecting stations, respectively, are separated to open the elongated entrances to the wrapping spaces 227 to facilitate the insertion of the publication with its wrapper into one space and the ejection of the rolled and wrapped publication from the other space. The other fixed and movable arms for the other two rolls 229 and 230 associated with the band 228 which are illustrated in Fig. 6 as operating to roll and wrap two publications, respectively, are locked together so that the fixed arms on the rotating hubs 248 may push the movable arms along and so that the movable arms may not run away from the fixed arms under the influence of gravity when swinging downwardly toward the ejecting station.

To this end a short rock-shaft 310 (Fig. 10) is rotatably mounted in a block 311 (Fig. 12) bolted to each of the half-bearings 272 carried by the free arms 270 with which the rolls 230 are associated. One end of the rock-shaft 310 is provided with an arm 312 which is normally held engaged with the adjacent bar 273 by a coiled spring 313 one end of which is engaged with the block 311 and the other end of which is engaged with the arm 312. At its free end the arm 312 is provided with a short and narrow extension 314 projecting laterally beneath the end of the bar 273 which, as shown in Fig. 12, is reduced in thickness. The other end of the rock-shaft 310 is provided with an arm 315 which is held by the spring 313 beneath a shoulder 316 formed on a plate 317 bolted to the half-bearings 249 on the fixed arms 247 with which the rolls 229 are associated. When the two arms 315 are engaged with the two shoulders 316 the half-bearings 272 connected by the bar 273 are locked in engagement with the two half-bearings 249, respectively, connected by the plate 267. Thus, notwithstanding the fact that the roll 230 is mounted on the free arms 270 it is rotated about the axis of the shaft 252 by the rotation of the fixed arms 248 from which the roll 229 is supported.

In order to remove the arms 315 from engagement with the shoulders 316 thus to unlock the half-bearings 249 and 272, to separate the rolls 229 and 230 and open the elongated entrance to the wrapping spaces 227 located at the inserting and ejecting stations, the bearings for the shaft 252 in the brackets 253 and 254 support rotatably hubs 318 and 319, respectively, (Fig. 9).

The hub 318 is provided with two arms 320 and 321 (Figs. 6 and 8) arranged relatively at an angle of ninety degrees. The hub 319 is provided with two similar arms 322 and 323 (Fig. 8). The arms 320 and 322 operate to unlock the half-bearings 249 and 272 at opposite sides of the machine and to separate the rolls 229 and 230 at the ejecting station (Fig. 6), while the arms 321 and 323 operate to unlock the half-bearings 249 and 272 at opposite sides of the machine and to separate the rolls 229 and 230 at the inserting station.

To this end, each of the arms 320, 321, 322 and 323 is provided with a head 324, (Fig. 6). The outer face of the head 324 is provided with a cam surface 325 and a shoulder 326. The free end of the extension 314 (Fig. 12) wipes over the cam surface 325 and rocks the rock-shaft 310 against the tensioned spring 313 to remove the arms 315 from beneath the shoulders 316 thus to unlock the half-bearings 249 and 272. As the end of the extension 314 passes the shoulder 326 the tensioned spring 313 swings the extension into engagement with the face of the shoulder 326 which is shallow enough to allow the arm 315 to be held in the position of Fig. 12.

After the half-bearings 249 and 272 have been unlocked in the manner described, the arms 320 and 322 as one unit and the arms 321 and 323 as another unit, are swung to separate the rolls 230 at the ejecting and inserting stations, respectively, from their associated rolls 229. The hubs 318 and 319 are provided with a third arm 327 (Fig. 1) and 328 (Fig. 2), respectively. The arm 327 is connected by a link 329 to an arm 330 projecting from a rock-shaft 331 journaled in the lower ends of the brackets 253 and 254. The arm 328 is connected by a link 332 to an arm 333 projecting from the rock-shaft 331. The rock-shaft 331 is provided with a third arm 334 the free end of which is pivoted to one end of a longitudinal adjustable rod 335. The rod 335 is slotted (Fig. 1) to embrace and slide upon the cam-shaft 76 adjacent a cam 337. The free end of the rod 335 is provided with a roll 338 (Fig. 1) engaged in a groove 339 formed in one face of the cam 337.

From an inspection of Fig. 6, it appears that the rolls 229 and 230 at the ejecting and inserting stations are held separated by the arms 320, 321, 322 and 323 against the tensions of the springs 285, and, therefore, that these springs perform the double function of maintaining the rolls 289 engaged with the periphery of the cam 287 and of resisting the separation of the movable arms 270 from the fixed arms 247.

The cam groove 339 (Fig. 1) is shaped to swing the heads 325 counter clockwise, viewing Fig. 6, to unlock the half-bearings 272 approaching both the ejecting and inserting stations from their associated half-bearings 249, then to swing the heads 325 clockwise to separate the rolls 230 from the rolls 231 and thus open the elongated entrance to the wrapping spaces 227, then to stop for the purpose of holding the roll 230 in the position of Fig. 15 to facilitate the insertion of the publication with its wrapper into the wrapping space 227 and to allow the following roll 229 to all but close the entrance to the wrapping space, then to move the roll 230 upwardly while maintaining the all but closed relationship between the rolls 229 and 230 until the publication and the wrapper are in the wrapping space, to stop to allow the half-bearings 249 to engage the half-bearings 272, and finally to swing counter clockwise to repeat the cycle. It will be understood that as soon as the heads 325 swing away from the extensions 314 after the half-bearings 249 have engaged the half-bearings 272, that the tensioned springs 313 will swing the arms 315 under the shoulders 316, thus locking the half-bearings together so that the fixed and movable arms 247 and 270 move together until the half-bearings 249 and 272 are unlocked again.

In order to close completely the elongated entrance to the wrapping space after the publication with its wrapper has been inserted therein, the shafts 245 are provided with collars 345 (Fig. 23) on opposite sides of the rolls 229. Each collar 345 supports frictionally the hub 346 of a guide arm 347 the back face of which is provided with a cam surface 348 which engages a collar 349 (Fig. 8) on the shaft 268 for the roll 230. The hubs 346 on opposite sides of a roll 229 are connected by a long door 350. The door 350 is provided with a curved face 351 (Fig. 21) which lies close to the band covered roll 229, a curved face 352 shaped to engage the rolled and wrapped publication in the wrapping space 227, and four projecting rests 353.

As shown in Fig. 21, when a wrapping space is located at the inserting station the rolls 229 and 230 are separated and the pair of guide arms 347 extend from the shaft 245 on opposite sides of the roll 229 into engagement with the collars 349 on opposite sides of the roll 230. As the direction of rotation of the shaft 245 is counter clockwise the friction between the collars 345 and the hubs 346 of the guide arms 347 tends to maintain the cam surfaces 348 engaged with the collars 349. This tendency is augmented by the weight of the piece 350. When the carriers for the roll 229 move toward the carriers for the roll 230 the cam surfaces 348 swing the curved face 352 on the door 350 into engagement with the wrapper around the publication being rolled and wrapped in the wrapping space. As the wrapper is the last to enter the wrapping space the four rests 353 operate to engage the four separated portions on the bottom face of the wrapper which are unprovided with adhesive so that the adhesive portion thereof may not drag into engagement with and smear any part associated with the wrapping space. As shown in Fig. 22 the hubs 346 are formed to fit about the collars 345.

Referring to Figs. 17, 18, 19 and 20, when the wrapping space 227 is located at the inserting station the rolls 229 and 230 are separated to open wide the entrance into the bight formed in the band 228 by the rolls 232 and 233. At this time the roll 289 associated with the tension roll 231 at the inserting station is approaching the depression 309 and the band is free from tension substantially. In fact the band 228 may be, and preferably is, so slack at this time that the rolls 229 and 230 may rotate in engagement therewith without driving it. The swinging frame (Figs. 5 and 15) is held swung downwardly and rearwardly in position to dump a publication and its wrapper appendage toward the wrapping space. The arms 234 are actuated rearwardly to form a bridge over which the publication and the wrapper may pass in being transferred from the swinging frame to the wrapping space. It will be understood that the arms 234 act as a bridge only until the leading edges of the publication and the wrapper are caught in the bight of the band 228, at which time the arms 234 return to the position of Fig. 5. It will also be understood that the rolls 212 and 213 engage the publication and that the rolls 107 and 108 engage the wrapper until the leading edges of the publication and the wrapper are held securely in the bight of the band 228.

The arms 234, in addition to acting as a bridge, may press the supported publication against the slack band and tension it sufficiently to start the drive thereof by the rolls 229 and 230 and to bend the leading edge of the publication downwardly about the rear ends of the arms 234 to initiate the first bend of the spiral into which the publication is to be rolled, may tuck the leading edge of the publication in position between the slack band and the bight-forming rolls, or may tuck said edge in said space and cooperate with the bight-forming rolls in initiating the first bend in the leading edge of the publication. But even if the bight-forming rolls are used to predetermine the initial bend of the leading edge of the publication, either alone or in conjunction with the arms 234, the rolls are withdrawn substantially as soon as they have performed their bending function on the leading edge of the publication. As shown in Fig. 19, the bight-forming rolls are withdrawn from engagement with the publication before a single convolution is formed therein. As indicated in Fig. 19 the roll 230 is being held, or is being moved slowly, to allow the roll 229 to move into an adjacent position and narrow the entrance into the wrapping space. During this movement of the roll 229 the cam surfaces 348 (Figs. 21, 22 and 23) engage the collars 349 on the shaft for the roll 230 and swing the curved face 352 of the door 350 into engagement with the partially rolled publication to prevent it from rolling out of the entrance into the wrapping space before it is fully closed. When the carriers for the rolls 229 and 230 are locked together the curved face 352 substantially closes the entrance into the wrapping space. During the rolling of the publication and its wrapper appendage the band 228 and the curved face 352 form substantially a cylindrical wrapping space. As shown in Fig. 20 the rotating rolls 229 and 230 engage portions of the band 228 which are in direct engagement with the rolled publication. The publication is thus subjected, through the band 228, to the pressure exerted by the rotating rolls 229 and 230. This pressure aids particularly in securing the sticky trailing edge of the wrapper to an adjacent convolution thereof thus to hold the publication in a rolled condition notwithstanding its tendency to spring back into a flat form.

When the wrapping space containing the rolled and wrapped publication arrives at the ejecting station the carriers for the rolls 229 and 230 are unlocked and the rolls are separated to open wide the entrance into the wrapping space. During the separation of the rolls the door 350 swings downward away from the entrance into the wrapping space. In order to overcome any tendency for the rolled and wrapped publication to continue to roll in the bight of the band 228 after the entrance into the wrapping space is opened wide the cam 287 (Fig. 11) is provided with a rise 354 which acts on the roll 289 associated with the tension roll 231 at the ejecting station to rock the rock-shaft 279 against the tension of the spring 285 associated therewith to swing the roll 231 away from the bight, thus to slacken momentarily the tension on the band and start the movement of the rolled and wrapped publication out of the wrapping space under the influence of gravity. The rolled and wrapped publication ejected from the wrapping space drops upon an apron 355 (Figs. 6, 8 and 9) and is directed thereby into some suitable receptacle (not shown).

It will be understood that the main purpose of the rotary carrier is to increase the output of the machine and that the inserting and ejecting stations could be located at the same place, whether a rotary carrier was provided or not. It should be understood also that the postal authorities may require some publishers to wrap their publications in a manner permitting the ready removal of the publication from its wrapper to facilitate inspection and the easy replacement of the inspected publication within its wrapper. In consequence, the relative arrangement of the trailing edge of the publication and the leading edge of the wrapper may be varied to suit the demand. That is, the overlap of the publication on the wrapper may vary widely. In fact the wrapper may be inserted into the bight after the publication has been rolled therein.

Nothing herein explained is to be interpreted as limiting the invention in the scope of its application to use in connection with the particular apparatus or the particular mode of operation or both selected for purposes of illustration and explanation. While the particulars of construction herein set forth are well suited to one mechanical form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. A machine of the class described having, in combination, means including an endless band for rolling flat material and securing a wrapper around the rolled material, a support co-operating with the band, and means for inserting the leading edge of the flat material in between the band and the support to bend the leading edge of the flat material about the support in a predetermined direction.

2. A machine of the class described having, in combination, means including an endless band for rolling flat material and securing a wrapper around the rolled material, a support co-operating with the band, and means for inserting the leading edge of the flat material in between the band and the support to tension the band and cause the tensioned band to bend the leading edge of the flat material about the support in a predetermined direction.

3. A machine of the class described having, in combination, a band, means for supporting the band including a tension roll, a support, means for inserting the leading edge of the material to be rolled and wrapped in between the band and the support to tension the band and cause the tensioned band to bend the leading edge of the material about the support in a predetermined direction, and means for operating the tension roll to tension the band preliminary to the insertion of the leading edge of the material in between the band and the support and to permit the band to be tensioned further by the act of insertion.

4. In a rolling and wrapping machine, the combination with means including an endless band for rolling flat material and securing a wrapper around the rolled material and means engaging one face of the band for supporting, driving and tensioning the band, of means engaging the other face of the band adjacent its opposite side edges for forming a bight therein.

5. In a rolling and wrapping machine, the combination with a band, a plurality of driving rolls therefor and a tension roll engaging one of the runs of the band extending between the driving rolls, of a pair of rolls for forming a bight in the other run of the band extending between the driving rolls.

6. In a rolling and wrapping machine, the combination with a band, means independent of the work for forming a bight therein and means for rolling and wrapping the work in the bight, of automatic means for positively controlling the tension on the band.

7. In a rolling and wrapping machine, the combination with a band, a plurality of driving rolls therefor, a tension roll engaging one of the runs of the band extending between the driving rolls, and means for forming a bight in the other run of the band extending between the driving rolls, of automatic means for moving the tension roll towards the bight to condition the band for the insertion of the material to be rolled and wrapped into the bight.

8. In a rolling and wrapping machine, the combination with a band, a plurality of driving rolls therefor, a tension roll engaging one of the runs of the band extending between the driving rolls, and means for forming a bight in the other run of the band extending between the driving rolls, of automatic means for moving the tension roll toward the bight to slacken the band to facilitate the ejection of the rolled and wrapped material from the bight.

9. In a rolling and wrapping machine, the combination with a band, a plurality of driving rolls therefor, a tension roll engaging one of the runs of the band extending between the driving rolls, and means for forming a bight in the other run of the band extending between the driving rolls, of automatic means for controlling the tension exerted by the bight on the material engaged thereby.

10. In a rolling and wrapping machine, the combination with a band, a plurality of driving rolls therefor, a tension roll engaging one of the runs of the band extending between the driving rolls, and means for forming a bight in the other run of the band extending between the driving rolls, of automatic means for moving the tension roll to vary the tension on the band.

11. In a rolling and wrapping machine, the combination with a band, a plurality of driving rolls therefor, means for forming a bight in one of the runs of the band extending between the driving rolls, and a tension roll engaging the other run of the band extending between the driving rolls, of means for supporting the tension roll comprising a shaft, a pair of arms in which the shaft is journaled, a rock-shaft upon which the arms are supported, a spring for rocking the rock-shaft in one direction and a cam for rocking the rock-shaft in the other direction.

12. A rolling and wrapping machine having, in combination, a band, a plurality of driving rolls therefor, a plurality of driving roll carriers, a tension roll engaging one of the runs of the band extending between the driving rolls, means for forming a bight in the other run of the band extending between the driving rolls, and means for locking the carriers together.

13. A rolling and wrapping machine having, in combination, a band, a plurality of driving rolls therefor, a plurality of driving roll carriers, a tension roll engaging one of the runs of the band extending between the driving rolls, means for forming a bight in the other run of the band extending between the driving rolls, means for locking the carriers together, and means for closing the entrance between the driving rolls into the bight when the carriers are locked together.

14. A rolling and wrapping machine having, in combination, a band, a plurality of driving rolls therefor, a plurality of driving roll carriers, a tension roll engaging one of the runs of the band extending between the driving rolls, means for forming a bight in the other run of the band extending between the driving rolls, means for locking the carriers together, means for closing the entrance between the driving rolls into the bight when the carriers are locked together, and means for unlocking the carriers and for separating the driving rolls to facilitate the insertion of the material to be rolled and wrapped into the bight.

15. A rolling and wrapping machine having, in combination, a band, a plurality of driving rolls therefor, a plurality of driving roll carriers, a tension roll engaging one of the runs of the band extending between the driving rolls, means for forming a bight in the other run of the band extending between the driving rolls, means for locking the carriers together, means for unlocking the carriers and for separating the driving rolls to facilitate the insertion of the material to be rolled and wrapped into the bight, and means for moving the tension roll towards the bight to condition the band for the insertion of the material into the bight.

16. A rolling and wrapping machine having, in combination, a band, a plurality of driving rolls therefor, a plurality of driving roll carriers, a tension roll engaging one of the runs of the band extending between the driving rolls, means for forming a bight in the other run of the band extending between the driving rolls, means for locking the carriers together, means for unlocking the carriers and for separating the driving rolls to facilitate the ejection of the rolled and wrapped material from the bight, and means for moving the tension roll toward the bight to slacken the band to facilitate the ejection of the rolled and wrapped material from the bight.

17. In a machine for rolling a publication and securing a wrapper around the rolled publication, the combination with an endless belt, means for supporting and driving the belt and for forming a bight therein, and means for inserting a publication and the wrapper therefor into the bight, of means for operating the bight-forming means to determine positively the direction of bend of the leading edge of the publication inserted into the bight.

18. A rolling and wrapping machine having, in combination, a band, means for supporting and driving the band including a pair of rolls, means for continuously forming a bight in the run of the band extending between the driving rolls, and automatic means for holding normally the peripheries of the driving rolls spaced apart a distance less than the extended diameter of the bight.

19. A rolling and wrapping machine having, in combination, a band, means for supporting and driving the band including a pair of rolls, means for forming a bight in the run of the band extending between the driving rolls, means for holding normally the peripheries of the driving rolls spaced apart a distance less than the extended diameter of the bight, and means for separating the peripheries of the driving rolls to facilitate the insertion of the material to be rolled and wrapped into the bight.

20. A rolling and wrapping machine having, in combination, a band, means for supporting and driving the band including a pair of rolls, means for forming a bight in the run of the band extending between the driving rolls, means for holding the peripheries of the driving rolls spaced apart a distance less than the extended diameter of the bight, means for separating the peripheries of the driving rolls to facilitate the insertion of the material to be rolled and wrapped into the bight, and means for thereafter returning the rolls to their normal spaced relation.

21. A rolling and wrapping machine having, in combination, a band, means for supporting and driving the band including a pair of rolls, means for forming a bight in the run of the band extending between the driving rolls, means for holding normally the peripheries of the driving rolls spaced apart a distance less than the extended diameter of the bight, means for separating the peripheries of the driving rolls to facilitate the insertion of the material to be rolled and wrapped into the bight, means for thereafter returning the rolls to their normal spaced relation, and means for closing the space between the peripheries of the driving rolls.

22. A rolling and wrapping machine having, in combination, a band, means for supporting and driving the band including a pair of rolls, means for forming a bight in the run of the band extending between the driving rolls, means for holding normally the peripheries of the driving rolls spaced apart a distance less than the extended diameter of the bight, means for separating the peripheries of the driving rolls to facilitate the insertion of the material to be rolled and wrapped into the bight, means for thereafter returning the rolls to their normal spaced relation, and means engaging the periphery of the material in the bight across its width for closing the space between the peripheries of the driving rolls.

23. In a rolling and wrapping machine, the combination with a band and means engaging one face of the band for forming a plurality of runs therein, of means engaging the other face of the band for forming and maintaining a rolling and wrapping space bight in one of the runs.

24. In a rolling and wrapping machine, the combination with an endless band and means engaging one face of the band for forming three runs therein, of means engaging the other face of the band for forming and maintaining a rolling and wrapping space bight in one of the runs entirely within the other two runs.

25. In a rolling and wrapping machine, the combination with a band and means for supporting and driving the band including a pair of rolls, of continuously operating means for forming a rolling and wrapping space bight in the run of the band extending between the two driving rolls.

26. A rolling and wrapping machine having, in combination, an endless band, means for supporting and driving the band including two rolls, means for forming a bight in the run of the band extending between the two rolls, and means having a curved surface directed towards the bight for closing the opening between the rolls into the bight, the bight, the curved surface and the band engaged with a portion of the peripheries of the roll forming a cylindrical wrapping space.

27. A rolling and wrapping machine having, in combination, an endless band, means for supporting and driving the band including two rolls, means for forming a bight in the run of the band extending between the two rolls, and means having a curved surface directed towards the bight for closing the opening between the rolls into the bight, the bight, the curved surface and the band engaged with a portion of the peripheries of the roll forming a cylindrical wrapping space, said wrapping space having a diameter greater than the width of the opening between the rolls.

28. A rolling and wrapping machine having, in combination, a carrier, a series of normally closed wrapping spaces mounted upon the carrier, an inserting station, an ejecting station, and connected mechanism operating automatically to rotate the carrier to transfer the wrapping spaces successively from the inserting station around to the ejecting station and back to the inserting station, to open the spaces at the inserting and ejecting stations, to insert the material to be rolled and wrapped into the open space at the inserting station, to eject the rolled and wrapped material from the space at the ejecting station, to maintain the spaces intermediate the inserting and ejecting stations closed, and to roll and wrap the material in the closed spaces.

29. In a rolling and wrapping machine, the combination with a magazine for the publications to be rolled and wrapped, mechanism for feeding the publications one at a time from the magazine, mechanism for feeding a wrapper for each publication withdrawn from the magazine, and means for suspending the operation of the publication feeding mechanism upon the failure of the wrapper feeding mechanism to receive a wrapper to feed.

30. In a rolling and wrapping machine, the combination with a magazine for the publications to be rolled and wrapped, mechanism for feeding the publications one at a time from the magazine and means for feeding the wrapper for each publication, of a feeler mechanism engaged with the wrapper for maintaining the continued operation of the publication feeding mechanism.

31. In a rolling and wrapping machine, the combination with a magazine for the publications to be rolled and wrapped, mechanism for feeding the publications one at a time from the magazine and means for feeding the wrapper for each publication, of a feeler mechanism engaged with the wrapper for maintaining the continued operation of the publication feeding mechanism, said feeler mechanism operating in the absence of a wrapper for it to feel to suspend the operation of the publication feeding mechanism.

32. A rolling and wrapping machine, having in combination, a frame, a rolling and wrapping space, means on the frame for assembling a publication and a wrapper, means for inserting the assembled publication and wrapper into the wrapping space, and a bridge for supporting the publication and the wrapper during a portion at least of their transfer from the frame to the wrapping space.

33. A rolling and wrapping machine, having in combination, a band, means for supporting and driving the band including a pair of rolls, means for forming a bight in the run of the band extending between the rolls, means for holding the periphery of the driving rolls spaced apart a distance less than the extended diameter of the bight, means for separating the peripheries of the driving rolls to facilitate the insertion of the material to be rolled and wrapped into the bight, means for thereafter returning the rolls to their normal spaced relation and means engaging the periphery of the material in the bight across its width for closing the space between the peripheries of the driving rolls comprising a formed yoke supported to move on opposite sides of one of the driving rolls and a pair of cam guides carried by the yoke and engaged with collars mounted to move with the other one of the driving rolls.

34. In a rolling and wrapping machine, the combination with a band and means for supporting and continuously driving the band including a pair of rolls, of positive means operating independently of the work for forming a rolling and wrapping space bight in the run of the band extending between the rolls.

35. A rolling and wrapping machine having, in combination, a band, means for supporting and driving the band including a pair of rolls, means for continuously forming a bight in the run of the band extending between the driving rolls, means for holding normally the peripheries of the driving rolls spaced apart a distance less than the extended diameter of the bight, and means for separating the peripheries of the driving rolls to facilitate the insertion of the material to be rolled and wrapped into the bight.

36. A rolling and wrapping machine having, in combination, a band, means for supporting and driving the band incluidng a pair of rolls, means for continuously forming a bight in the run of the band extending between the driving rolls, means for holding normally the peripheries of the driving rolls spaced apart a distance less than the extended diameter of the bight, means for separating the peripheries of the driving rolls to facilitate the insertion of the material to be rolled and wrapped into the bight, and means for thereafter returning the rolls to their normal spaced relation.

37. In a rolling and wrapping machine, the combination with a band, means for forming a bight therein and means for rolling and wrapping material in the bight, of a cam operated roll for controlling the tension of the band.

38. A rolling and wrapping machine having, in combination, a frame, a rolling and wrapping space, means on the frame for handling a publication and a wrapper, respectively, means for inserting the leading edges of the publication and the wrapper successively into the wrapping space, and a bridge for supporting the publication and the wrapper during a portion at least of their transfer from the frame to the wrapping space.

39. A rolling and wrapping machine having, in combination, a frame, a rolling and wrapping space, means on the frame for handling a publication and a wrapper, respectively, means for inserting the leading edges of the publication and the wrapper successively into the wrapping space, and a bodily movable cam operated bridge for supporting the publication and the wrapper during a portion at least of their transfer from the frame to the wrapping space.

40. In a rolling and wrapping machine, the combination with a band, means for continuously forming a bight therein, and means for rolling and wrapping material in the bight, of means for handling the material including a swinging frame having a discharge end directed towards the bight.

41. In a rolling and wrapping machine, the combination with a band, means for continuously forming a bight therein, means for rolling and wrapping material in the bight and a swinging frame having a discharge end directed towards the bight, of a bridge interposed between the discharge end of the frame and the bight.

42. In a rolling and wrapping machine, the combination with a band, means for continuously forming a bight therein, means for opening and closing the entrance into the bight, and means for rolling and wrapping material in the bight, of means comprising a swinging frame for discharging the material towards the bight when its entrance is open.

43. In a rolling and wrapping machine, the combination with a bodily movable band, means for continuously forming a bight therein, means for opening and closing the entrance into the bight, and means for rolling and wrapping material in the bight, of a frame past one end of which the bight moves and means for swinging the frame to discharge the material towards the bight when its entrance is open.

IRVING F. MANDELL.